US012083950B1

(12) United States Patent
Aguirre Contreras et al.

(10) Patent No.: US 12,083,950 B1
(45) Date of Patent: Sep. 10, 2024

(54) VEHICLE PROJECTOR FOR PROJECTING AND MODIFYING A LIGHT PATTERN ASSOCIATED WITH A MOVING OBJECT

(71) Applicant: Zoox, Inc., Foster City, CA (US)

(72) Inventors: Sergio Angel Aguirre Contreras, Fremont, CA (US); Carter William McEathron, Mountain View, CA (US); Andrew Mark Stieber, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 378 days.

(21) Appl. No.: 17/554,345

(22) Filed: Dec. 17, 2021

(51) Int. Cl.
*B60Q 1/24* (2006.01)
*G01S 17/931* (2020.01)

(52) U.S. Cl.
CPC .............. *B60Q 1/24* (2013.01); *G01S 17/931* (2020.01); *B60Q 2400/50* (2013.01)

(58) Field of Classification Search
CPC ...... B60Q 1/24; B60Q 2400/50; G01S 17/931
See application file for complete search history.

(56) References Cited

U.S. PATENT DOCUMENTS

| | | | |
|---|---|---|---|
| 2016/0207443 A1* | 7/2016 | Widdowson | B60Q 1/0011 |
| 2019/0078373 A1* | 3/2019 | Schulz | B60Q 1/0023 |
| 2020/0164794 A1* | 5/2020 | Kasuga | B62J 45/4152 |
| 2020/0307448 A1* | 10/2020 | Shih | B60Q 1/50 |
| 2021/0061224 A1* | 3/2021 | Kim | B60R 25/01 |
| 2021/0323764 A1* | 10/2021 | Koga | H04N 9/3147 |
| 2022/0100193 A1* | 3/2022 | Salter | B60Q 1/50 |
| 2023/0041503 A1* | 2/2023 | Salter | E05F 15/40 |

* cited by examiner

*Primary Examiner* — Anne Marie Antonucci
*Assistant Examiner* — Patrick Daniel Mohl
(74) *Attorney, Agent, or Firm* — EIP US LLP

(57) ABSTRACT

There is provided a vehicle and method for projecting a light pattern. The method comprises: projecting a light pattern to match a footprint of an object, wherein the object is associated with a vehicle and is moveable relative to the vehicle, and wherein the footprint is indicative of an area that the object is or will be occupying. The method further comprises modifying the projected light pattern based on a state of the object.

19 Claims, 17 Drawing Sheets

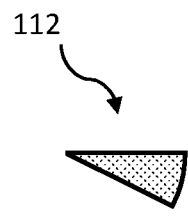
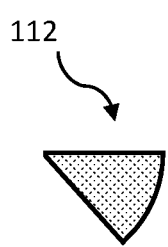
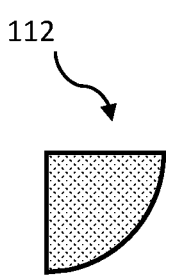
FIG. 6A  FIG. 6B  FIG. 6C
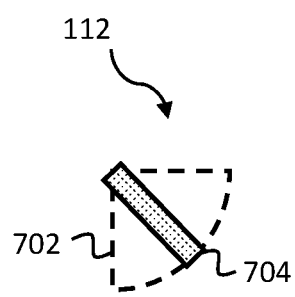
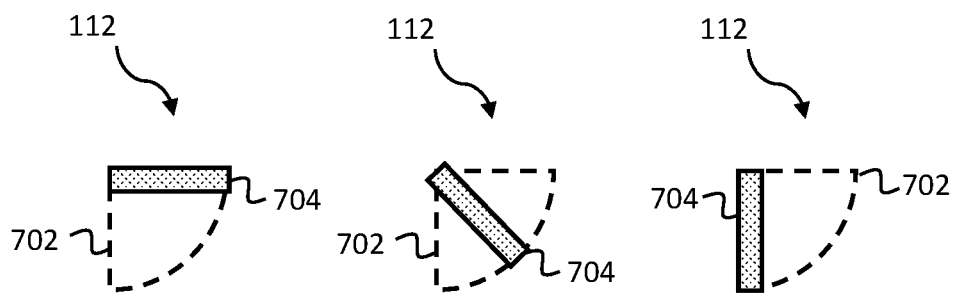
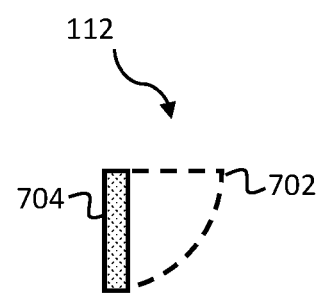
FIG. 7A  FIG. 7B  FIG. 7C

VEHICLE PROJECTOR FOR PROJECTING AND MODIFYING A LIGHT PATTERN ASSOCIATED WITH A MOVING OBJECT

BACKGROUND

Autonomous and partially autonomous vehicles are increasingly being tested and used not only for convenience, but also to improve road safety. Autonomous vehicles may have a combination of different sensors that can be used to detect nearby objects to help the vehicle navigate through the environment.

BRIEF DESCRIPTION OF DRAWINGS

The detailed description is described with reference to the accompanying figures. The use of the same reference numbers in different figures indicates similar or identical components or features.

FIGS. 6A-6C are pictorial diagrams of an example light pattern and how it is modified over time;

FIGS. 7A-7C are pictorial diagrams of another example light pattern and how it is modified over time;

DETAILED DESCRIPTION

Figure 1A:
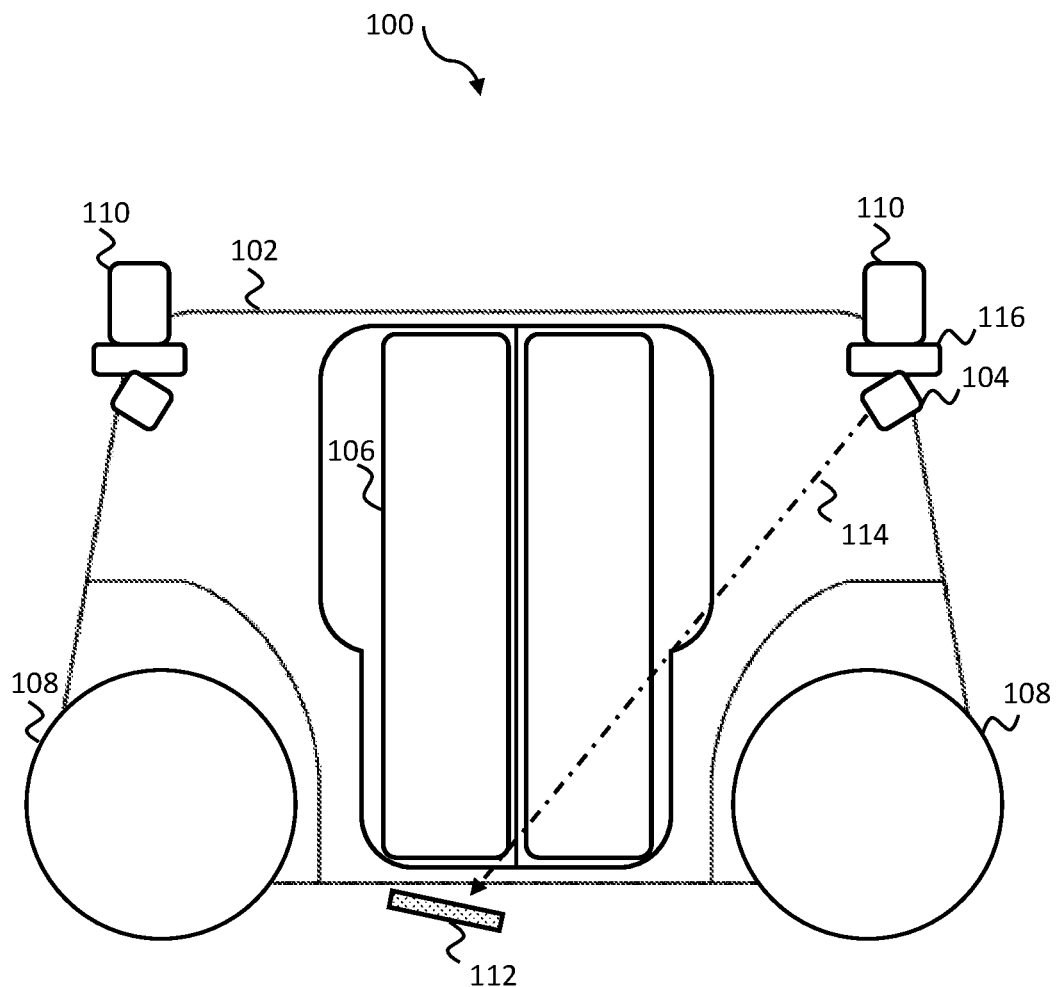
FIGS. 1A-1D are pictorial diagrams of an example vehicle with a projector that projects different light patterns over time as an object associated with the vehicle moves.

This application relates to vehicles and methods for projecting moving patterns onto a surface, such as a sidewalk or road surface, to indicate that an object associated with the vehicle, such as a vehicle door or ramp, is moving or is about to move relative to the vehicle. For example, the vehicle may arrive at a particular location to collect or drop off a passenger. As the vehicle arrives at the location, it may be determined that an object associated with the vehicle is to move in the near future. For example, the door may need to open to allow a passenger to exit from the vehicle, or a ramp may need to be moved into a particular configuration so that a passenger in wheelchair can enter the vehicle. In both cases, the object may move relative to the vehicle, which can pose a hazard to one or more passengers or pedestrians outside the vehicle or in its immediate vicinity.

To forewarn people nearby that the object is moving or is about to move, a vehicle can have a projector that projects a light pattern onto a surface, and the light pattern may be modified to reflect different states of the object during the course of its movement. For example, a sequence of images projected by the projector may show the door opening into an area on a sidewalk. This may inform the pedestrian how the object is, or will be, moving. As the door opens, its "state" may change over time. A "state" may therefore be a configuration state of the object, such as a position, location, orientation, etc. Example states may include "door open", "door closed", "door open by 20 degrees", "door open by 40 degrees", "ramp stowed", "ramp opened by 50%", etc., and each state may have an associated light pattern. The light pattern may substantially match a footprint of the object, where the footprint indicates an area that the object is or will be occupying. By projecting the footprint, the pedestrian is made aware of the area into which the object will move.

In examples, which will be described below with reference to FIGS. 1A-1D, the projector may project different light patterns onto the ground while the object is moving. This may be useful because although the object is already moving, the light pattern can indicate a future position of the object. For example, as the object is moving, the light pattern projected at a first time may be indicative of a footprint of the object at a second, later time. Thus, although the object is moving, the light pattern may still provide advance warning of where the object will be located at a later time. In addition, in some cases, the pedestrian may not notice the object moving because they are looking at the ground, so a moving light pattern projected on the ground can inform the pedestrian that the object is moving, even if the pedestrian is not looking at the object itself. In some examples, the projector may project the different light patterns based on a detected or measured state of the object. For example, a sensor system may determine the state of the object and may modify the light pattern based on the state of the object determined by the sensor system. In one particular example, the sensor system may determine a current state of the object and the projector may project a light pattern according to a future state, where the future state corresponds to a state immediately after the current state. For example, the sensor system may determine that the door is open by 45 degrees relative to the vehicle, and so project a light pattern indicative of the footprint of the object at 55 degrees relative to the vehicle.

In examples, which will be described below with reference to FIGS. 2A-2D, the projector may additionally or alternatively project different light patterns onto the ground even before the object moves, to indicate how the footprint of the object will change when the object does move. This provides a useful indication even before the object moves, improving the chance that e.g. a pedestrian ensures they are away from the object when it does move.

In the examples discussed above, the projected light pattern may be modified based on a state of the object, even if the object is not moving. Thus, the state may be an expected state of the object at a future time.

In examples, a vehicle may comprise a body, a projector, a sensor system configured to determine a state of an object, the object being associated with the vehicle, one or more processors coupled to the projector and the sensor system and one or more non-transitory computer readable media storing instructions executable by the one or more processors, wherein the instructions, when executed by the one or more processors, cause the vehicle to perform operations. The operations may comprise: (i) determining that the object is to move relative to the body, (ii) projecting, by the projector, a light pattern based on the determination that the object is to move, and (iii) modifying, based on the state of the object determined by the sensor system, the light pattern projected by the projector to match a footprint of the object as the object moves, wherein the footprint is indicative of an area that the object is or will be occupying.

The light pattern may be projected onto an exterior surface of the vehicle, such as the ground, sidewalk or road. In other examples, the light pattern may be projected onto a surface inside the vehicle, such as the floor of the vehicle. Projected patterns inside the vehicle can inform passengers that an object may move inside the vehicle. In a further example, the light pattern may be projected both inside the vehicle and outside the vehicle, perhaps by two or more projectors.

The projector may be connected to the body of the vehicle. In some examples, the projector may be positioned such that light projected by the projector is not blocked/interrupted by the object as it moves. However, in other examples, the projector may be positioned so that the light projected by the projector illuminates a reflector on the object as it moves.

In some examples, the object may be coupled or otherwise attached to the vehicle. For example, the door may be attached to, and even form part of the vehicle, such as part of the body of the vehicle. The body of the vehicle may form an exterior portion of the vehicle. In some examples, the object moves relative to an exterior portion of the vehicle.

In certain examples, the vehicle may have a first, initial footprint before the object moves relative to the vehicle, and the vehicle may have a second, different, footprint after the object has moved relative to the vehicle. The first and second footprints may have a different shape and/or area on a surface on which the vehicle is located. As discussed above, the object may also have an associated footprint.

In one example, determining that an object associated with the vehicle is to move relative to the body may comprise: detecting that the vehicle has arrived at a particular location, such as a collection or drop off location. In another example, determining that an object associated with the vehicle is to move relative to the body may comprise: detecting a user input to cause the object to move. For example, a user, such as a passenger, may press a button or other input to cause the object to move. In another example, determining that an object associated with the vehicle is to move relative to the body may comprise: detecting that a passenger has arrived at the vehicle or detecting that a user is requesting entrance to or exit from the vehicle. A user may request entrance to or exit from the vehicle via a software application installed on a mobile device. A passenger may be determined to have arrived at the vehicle via receipt of biometric data, such as recognizing facial features or a fingerprint of the user. Other examples are also envisaged.

Modifying the light pattern based on the state of the object may comprise projecting at least one additional light pattern, where the additional light pattern is different in appearance to an initial light pattern projected by the projector and is indicative of a different state of the object.

Modifying the light pattern based on the state of the object may comprise adjusting a position/location of the light pattern on the surface onto which the light pattern is projected. For example, the projector may be physically moved and/or a light beam of the projector may be controlled. In one example, the projector is moved/rotated based on the state of the object. As will be discussed, in some examples, the light pattern is additionally or alternatively modified based on a characteristic of an environment in which the vehicle is located.

Modifying the light pattern based on the state of the object may comprise adjusting one or more characteristics of the projector. For example, a brightness or beamwidth of the light source of the projector may be adjusted.

As mentioned, the sensor system may detect the state of the object as the object moves. For example, before the object moves, the object may have an initial state. As the object begins to move, the object may have first, second, third, fourth, etc. states. The final position of the object after movement may correspond to a final state. There may be two or more states associated with object, in some examples.

The sensor system may be communicatively coupled to the object (or a drive system configured to move the object), and may detect and/or generate data indicative of a state of the object. The one or more processors may additionally or alternatively generate data indicative of a state of the object based on data detected by the sensor system. In a particular example, the object is a door, and a drive system of the vehicle is configured to move the door. The drive system may comprise or be coupled to the sensor system, and the state of the door can be determined/inferred based on the operational state of the drive system.

In examples, a vehicle may comprise a body, a projector, one or more processors coupled to the projector, and one or more non-transitory computer readable media storing instructions executable by the one or more processors, wherein the instructions, when executed by the one or more processors, cause the vehicle to perform operations. The operations may comprise: (i) determining that an object associated with the vehicle is to move relative to the body, (ii) projecting, by the projector, a light pattern based on the determination that the object is to move, and (iii) modifying, based on a state of the object, the light pattern projected by the projector to match a footprint of the object, wherein the footprint is indicative of an area that the object is or will be occupying.

More detailed examples of the vehicle(s) and method(s) of the present disclosure will now be presented, with reference to the accompanying figures.

FIG. 1A depicts an example vehicle 100. The vehicle 100 has a body 102, a projector 104 and an object (in this case a door 106) moveable relative to the vehicle 100. The object may be coupled to the vehicle 100, and may form part of the body 102. The vehicle 100 further comprises wheels 108, which contact a surface along which the vehicle 100 can move. The vehicle 100 may further include one or more processors (not shown) and one or more non-transitory computer readable media (not shown) storing instructions executable by the one or more processors. The vehicle 100 may be an autonomous vehicle, for example.

In the following examples, for clarity, the object will be referred to as being a door 106. It will be understood that any reference to the "door" may equally apply to any other object associated with the vehicle that is moveable relative to the vehicle, such as ramp, steps, ladder, mirror, service panel, etc. The object may be attached to the vehicle, in certain examples.

According to certain examples, the vehicle 100 may comprise one or more sensors 110 which form part of a sensor system. The sensor system can measure characteristics of the environment in which the vehicle 100 is located, and may be used to gather data that allows the vehicle 100 to autonomously and safely navigate through the environment. As will be described, the sensor system may additionally or alternatively determine a state of the door 106 as it moves relative to the vehicle 100.

In this example, the projector 104 comprises a light source that may emit one or more beams 114 of visible light onto a surface to form the light pattern 112. In other examples, the projector 104 may emit electromagnetic radiation of any other wavelength, such as ultraviolet light. For example, a camera, perhaps forming part of a pair of augmented reality glasses, may detect wavelengths outside of the visible spectrum or ultraviolet emitters to activate corresponding retroreflective dyes (e.g., black light responsive). Although the beam of light 114 is illustrated as having a single beam 114, it will be appreciated that the light emitted by the projector may have a particular beamwidth wider than that which is illustrated. In some examples, the beamwidth may be controlled to alter the area of the light pattern 112 on the surface.

Figure 5:
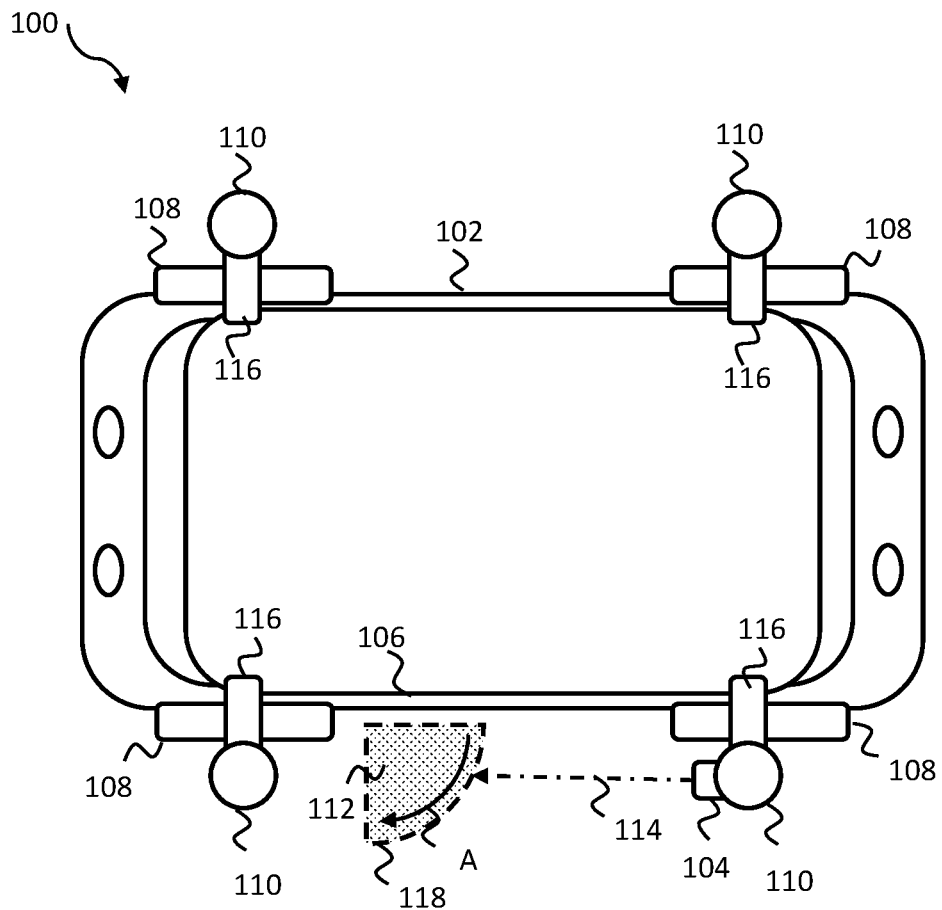
FIG. 5 is a pictorial diagram of another example vehicle as viewed from above and shows the footprint of the projected light pattern.

In this example, the projector 104 may be affixed to the vehicle body 102, located towards the top of the vehicle 100, and may be situated on an arm 116 that extends outwards from the vehicle body 102 (visible more clearly in FIG. 5). Similarly, one or more sensors 110 may be attached to the arm 116 (forming a sensor pod). Accordingly, in this example, the one or more sensors 110 and projector 104 may be collocated. Examples of sensor pods are described in US Patent Application No. US2021/0341583A1, which is hereby incorporated by reference in its entirety. In other examples, the projector 104 may be located elsewhere on the vehicle 100, such as below the door 106.

FIG. 1A depicts the vehicle 100 at a location within the environment at a first time. For example, the vehicle 100 may be about to drop off a passenger at their destination. In this example, the door 106 may be arranged in an initial state (such as an initial configuration state), and has not yet moved relative to the vehicle 100. For example, the door 106 may be closed.

As discussed, the vehicle 100 may comprise one or more sensors 110 forming a sensor system that is configured to determine/measure different states of the door 106. The projector 104 may therefore project light patterns based on the state of the door 106 determined by the sensor system. In one example, the sensor system may comprise a video camera 110. The sensor system may comprise one or more processors of the vehicle 100, in some examples. The one or more processors may receive data from the video camera 100 and determine a position/state of the door 106 based on the data, as the door 106 moves. For example, the data may indicate that the door is closed, fully open, or open by a particular amount. In another example, the sensor system may be coupled to, or comprise a drive system (not shown) that controls movement of the door 106. The drive system may comprise an actuator, such as a servo motor, for example. Signals generated by the drive system may cause the door 106 to open by a particular amount, such as 10 degrees, 20 degrees, 30 degrees, 40 degrees, 50 degrees, 60 degrees, 70 degrees, 80 degrees, and 90 degrees. These signals may be used by the sensor system to determine/infer a position/state of the door 106 as it moves. In either case, the sensor system can determine a state of the door 106 as the object moves. Data indicative of the state may be provided to one or more other components of the vehicle.

In one example, the sensor system may determine that the door 106 is currently in an initial state, and so it may be inferred/determined that the door 106 will soon be moving from the initial state to a first state, where the first state is a state at a future point in time. Accordingly, the projector 104 may project a light pattern 112 according to the first state, where the light pattern 112 is indicative of an area that the door 106 will be occupying at a time in the future. The projected light pattern may therefore be based on the state of the door determined by the sensor system, even though the footprint is not indicative of an area that the object is currently occupying. The light pattern 112 can therefore inform a pedestrian that the door 106 may soon occupy the area indicated by the light pattern 112. The light pattern 112 may therefore be indicative of a future state and/or position of the door 106.

In another example, however, the projector 104 may project a light pattern 112 according to a determined state, where the light pattern 112 is indicative of an area that the door 106 is currently occupying.

Figure 1B:
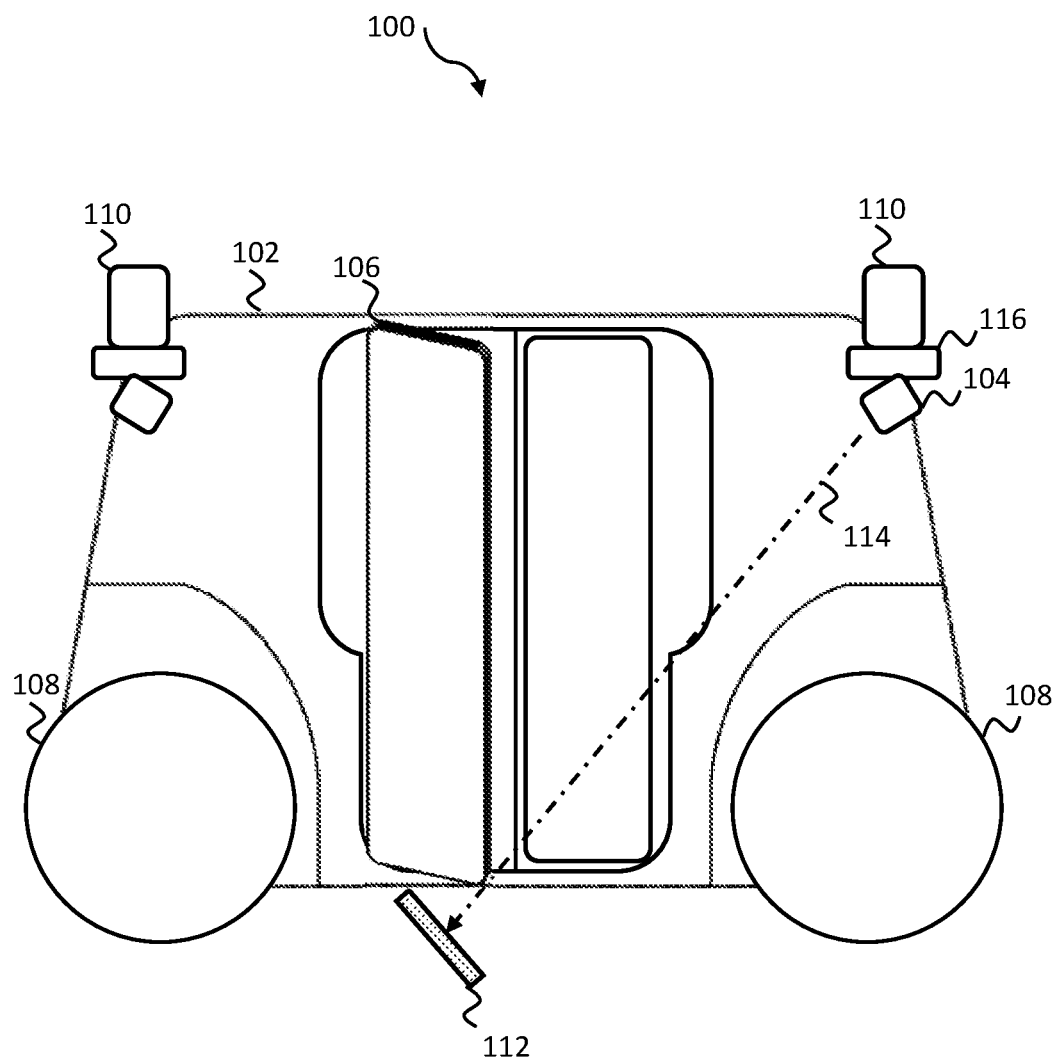

FIG. 1B depicts the vehicle 100 at a second, later time. Here, the door 106 has moved from the initial state depicted in FIG. 1A, and is now in a first state (i.e., slightly ajar). Here, the sensor system may determine that the door 106 is currently in the first state, and so it may be inferred/ determined that the door 106 will soon be moving from the first state to a second state. where the second state is a state at a future point in time. Accordingly, the projector 104 may project a light pattern 112 according to the second state, where the light pattern 112 is indicative of an area that the door 106 will be occupying at a time in the future. The light pattern 112 projected by the projector 104 has therefore been modified compared to the light pattern 112 of FIG. 1A.

In the examples of FIGS. 1A and 1B, the first footprint (i.e., that shown in FIG. 1A) may be orientated differently to the second footprint (i.e., that shown in FIG. 1B) relative to the vehicle 100. In other examples, the first footprint may additionally or alternatively have a different sized area to the second footprint.

Figure 1C:
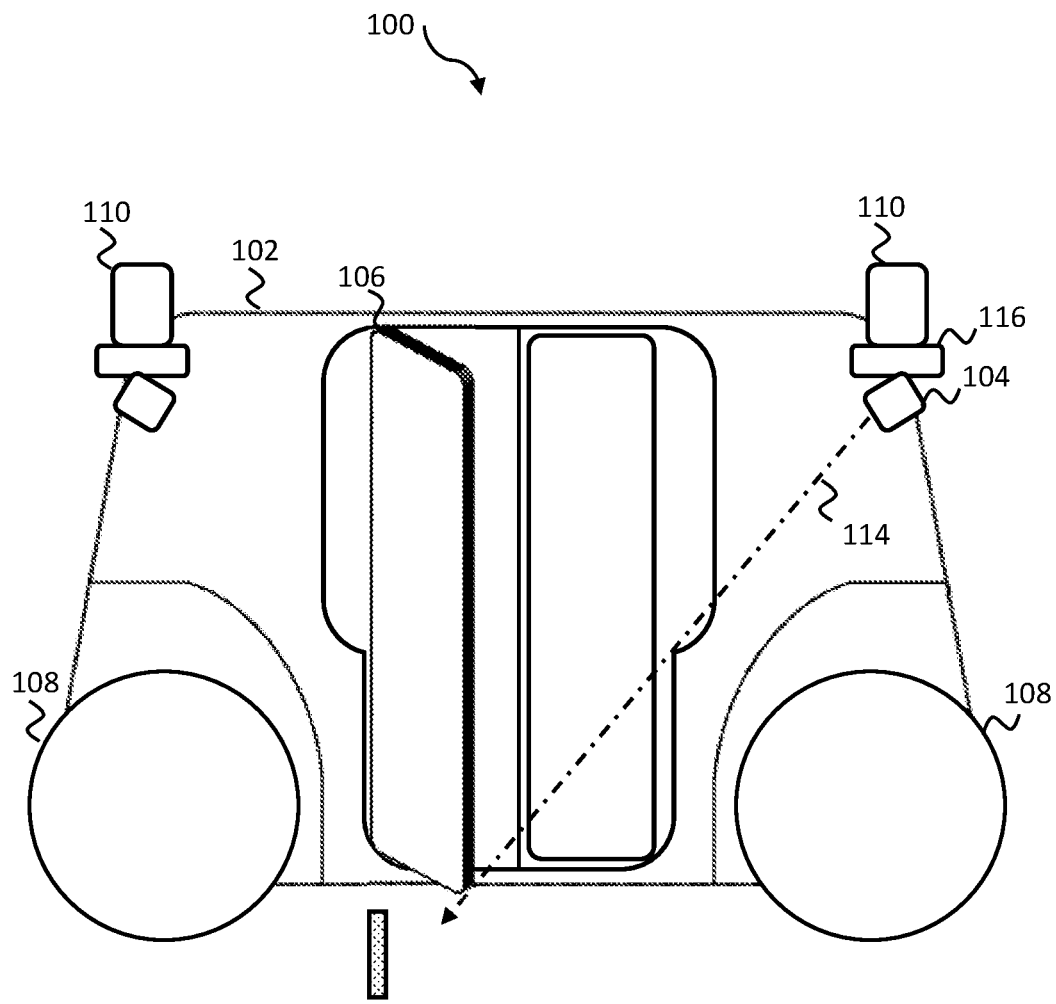

Similarly, FIG. 1C depicts the vehicle 100 at a third, later time. Here, the door 106 has moved from the first state depicted in FIG. 1B, and is now in a second state. Here, the sensor system may determine that the door 106 is currently in the second state, and so it may be inferred/determined that the door 106 will soon be moving from the second state to a third, final state, where the third state is a state at a future point in time. Accordingly, the projector 104 may project a light pattern 112 according to the third state, where the light pattern 112 is indicative of an area that the door 106 will be occupying at a time in the future. The light pattern 112 projected by the projector 104 has therefore been modified compared to the light pattern 112 of FIG. 1B.

Figure 1D:
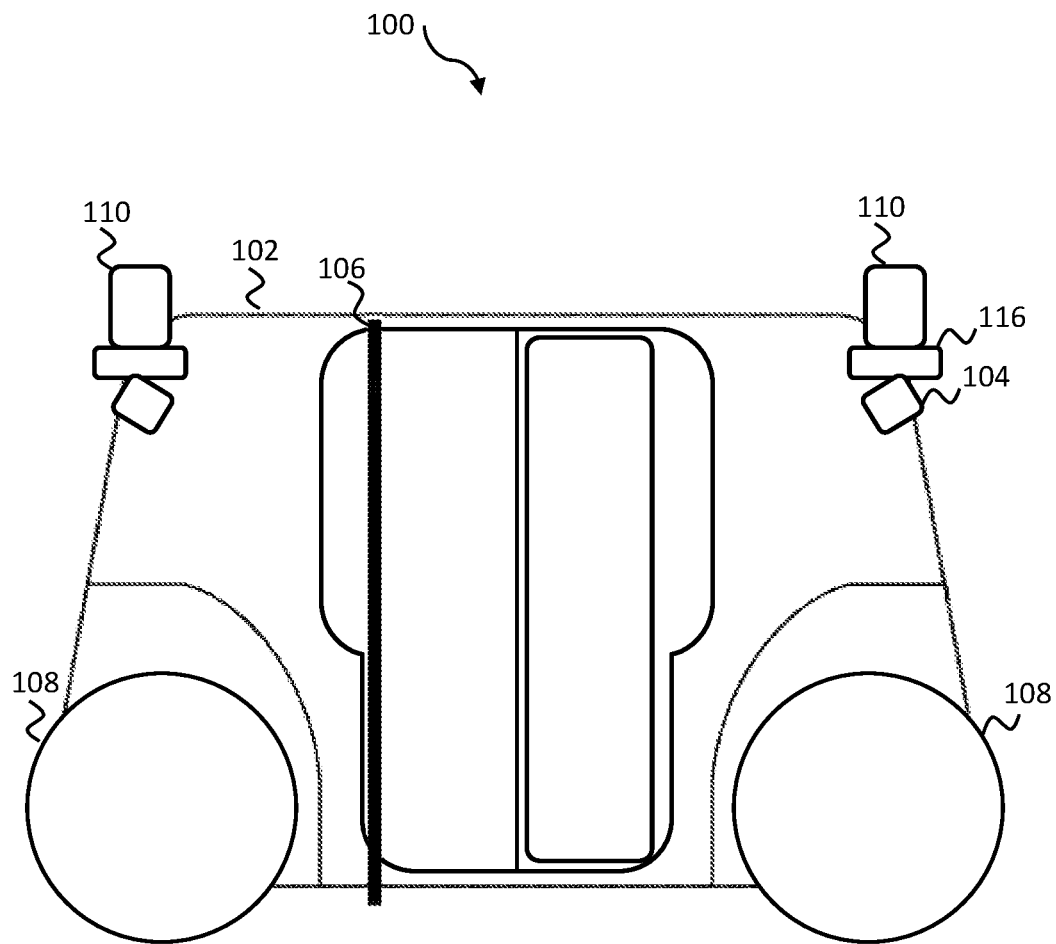

FIG. 1D depicts the vehicle 100 at a fourth, final time. Here, the door 106 has moved from the second state depicted in FIG. 1C, and is now in a third, final state. Here, the sensor system may determine that the door 106 is currently in the third and final state, and so it may stop projecting a light pattern.

In the examples of FIGS. 1A-1D, the projector 104 may project light patterns based on the state of the door 106 determined by the sensor system. This allows the projected light pattern to be modified as the object moves, in contrast to the following examples of FIGS. 2A-2D, where the light pattern is modified before the object moves. As briefly mentioned, displaying different light patterns over time, even before the object moves, may be useful to provide advanced warning to a pedestrian that the object is about to move. This can indicate how and where the door will move in future. FIGS. 2A-2D may be useful in an example scenario where the vehicle arrives at a particular location, and before the door opens, the projector projects multiple "snapshots" of the door's future positions. For example, a first light pattern may show the door open by 20 degrees, a second light pattern may show the door open by 40 degrees, a third light pattern may show the door open by 60 degrees, and so on, until a final light pattern may show where the door will be when it is fully open. A pedestrian learns the behavior of the moving door based on the viewed light patterns, and can ensure they have moved out of the way. After the final light pattern has been projected, the door may then open in the way the projector just previewed.

Figure 2A:
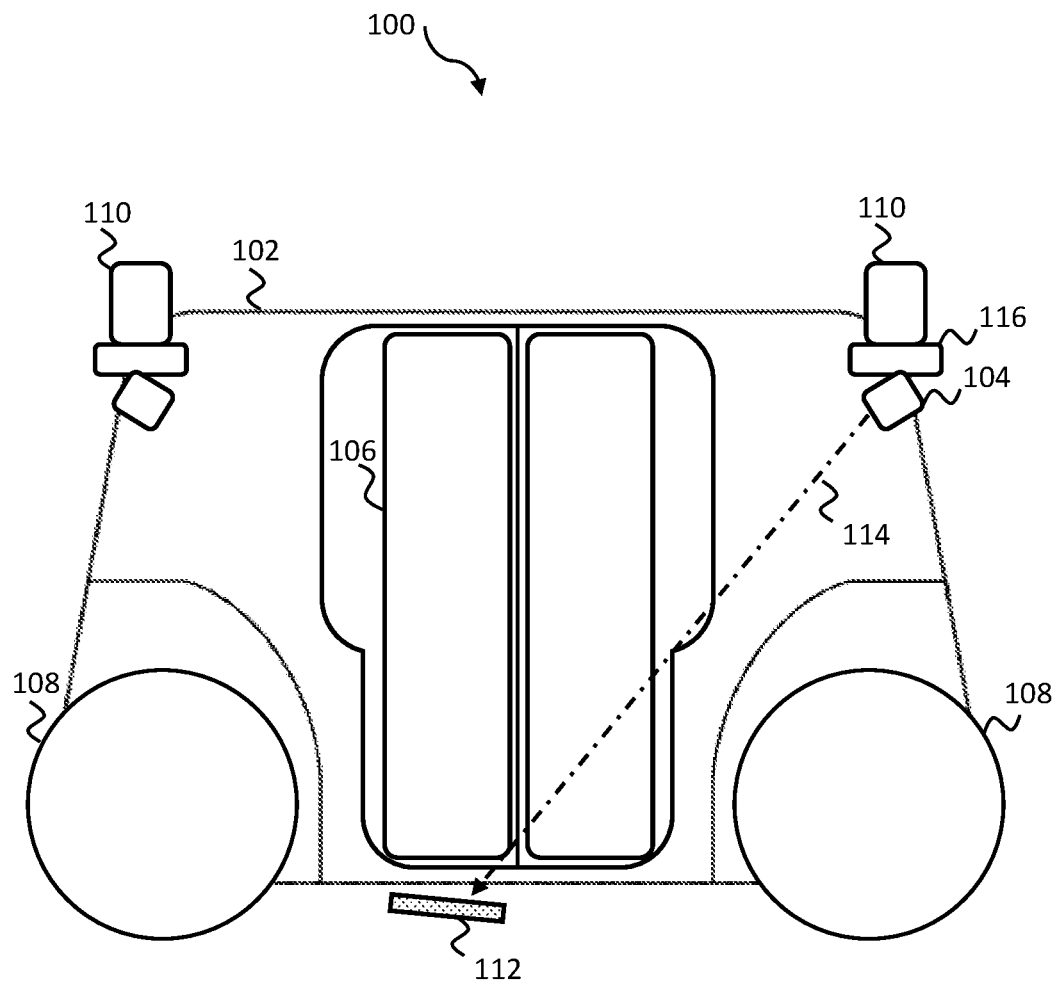
FIGS. 2A-2D are pictorial diagrams of another example vehicle with a projector that projects different light patterns over time.

Accordingly, FIG. 2A depicts the vehicle 100 at a location within the environment at a first time. For example, the vehicle 100 may be about to drop off a passenger at their destination. In this example, the door 106 is arranged in an initial state (such as an initial configuration state), and has not yet moved relative to the vehicle 100. For example, the door 106 may be closed. As the vehicle 100 arrives at its destination and comes to a stop, the one or more processors of the vehicle 100 may determine/detect that the door 106 is to move relative to the body. Accordingly, the projector 104 may be controlled to project a light pattern 112 onto a surface. The light pattern 112 may be indicative of a footprint of the door 106 that the door 106 will be occupying in future. The light pattern 112 can therefore inform a pedestrian that the door 106 may soon occupy the area indicated by the light pattern 112. The light pattern 112 may therefore be indicative of a future state and/or position of the door 106.

Figure 2B:
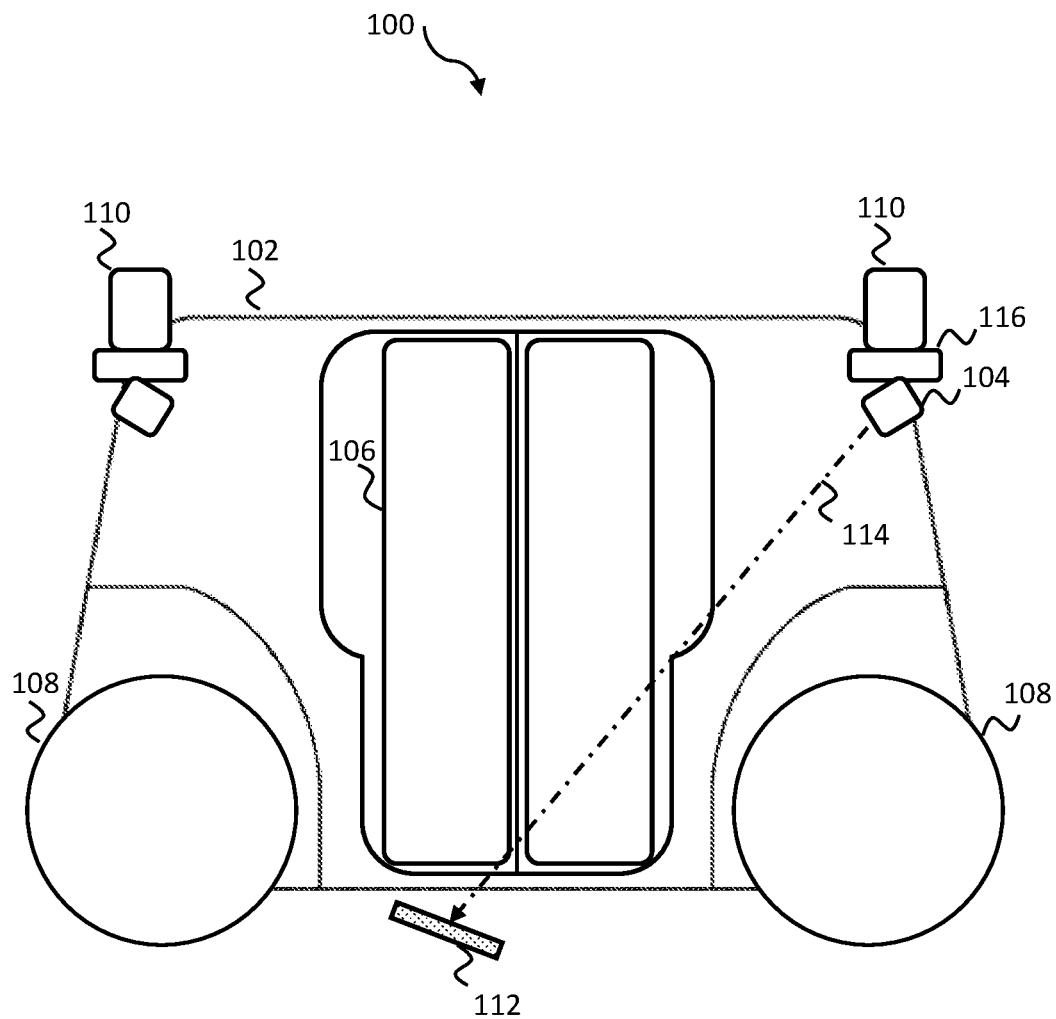

FIG. 2B depicts the vehicle 100 at a second, later time. Here, the projector 106 has modified the light pattern 112 compared to the previous light pattern 112 depicted in FIG. 2A. The light pattern 112 of FIG. 2B may be based on a different state of the door 106. For example, in FIG. 2A, the light pattern 112 is a first light pattern 112 corresponding to a first footprint of the door 106 based on a first state of the door 106 (in this case, a state indicative of the door 106 being slightly ajar). Thus, the first footprint is indicative of an area that the door 106 will be occupying at a time in the future, since the door is closed in FIG. 2A. In FIG. 2B, the light pattern 112 is a second light pattern 112 corresponding to a second footprint of the door 106 based on a second state of the door 106 (in this case, a state indicative of the door 106 being open by a particular amount, such as 30 degrees relative to the vehicle 100). Thus, the second footprint may be indicative of an area that the door 106 will be occupying at a different time in future.

In the examples of FIGS. 2A and 2B, the first footprint (i.e., that shown in FIG. 2A) may be orientated differently to the second footprint (i.e., that shown in FIG. 2B) relative to the vehicle 100. In other examples, the first footprint may additionally or alternatively have a different sized area to the second footprint.

Figure 2C:
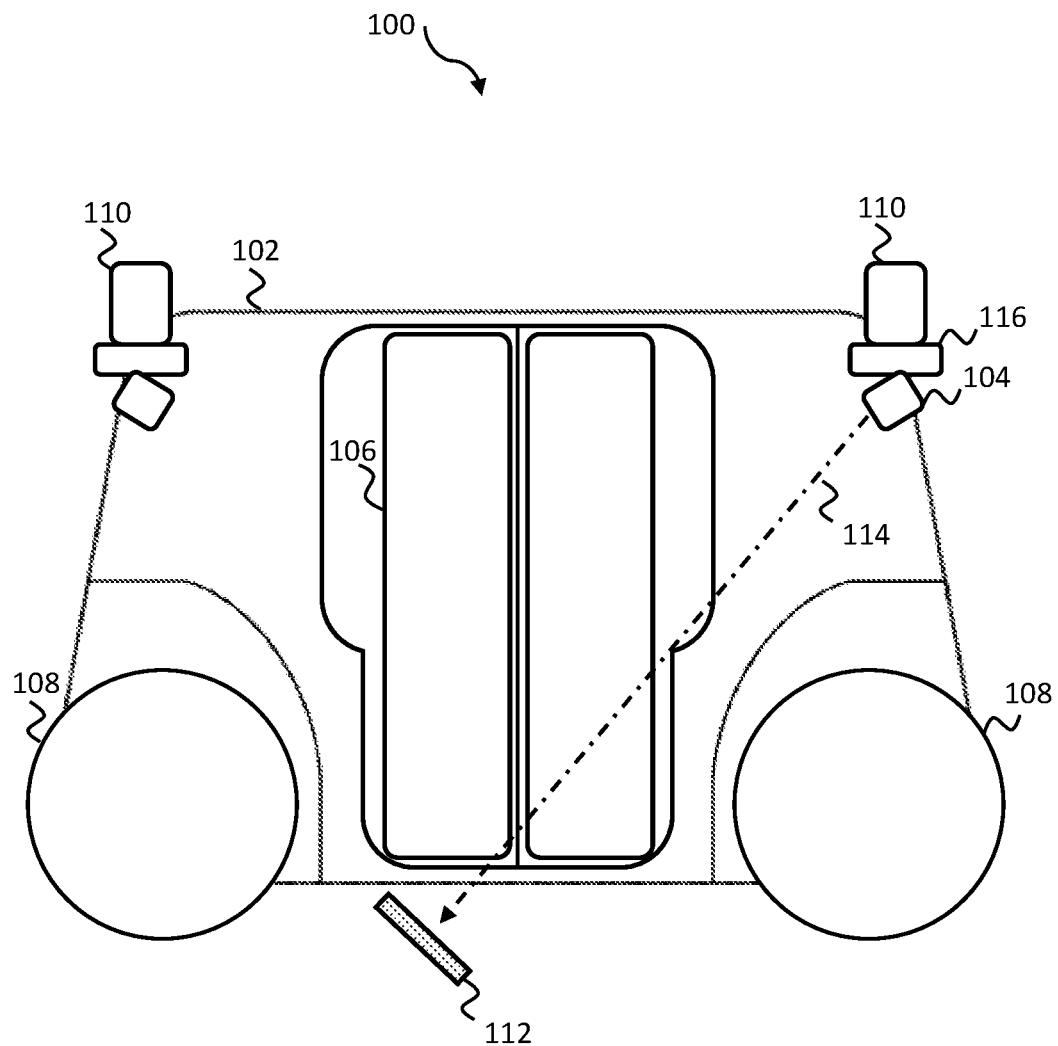

FIG. 2C depicts the vehicle 100 at a third, later time. Here, the projector 106 has modified the light pattern 112 compared to the previous light pattern 112 depicted in FIG. 2B, and again, the light pattern 112 may be based on a further state of the door 106. In FIG. 2C, the light pattern 112 is a third light pattern 112 corresponding to a third footprint of the door 106 based on a third state of the door 106 (in this case, a state indicative of the door 106 being open by a further amount, such as 50 degrees relative to the vehicle 100).

Figure 2D:
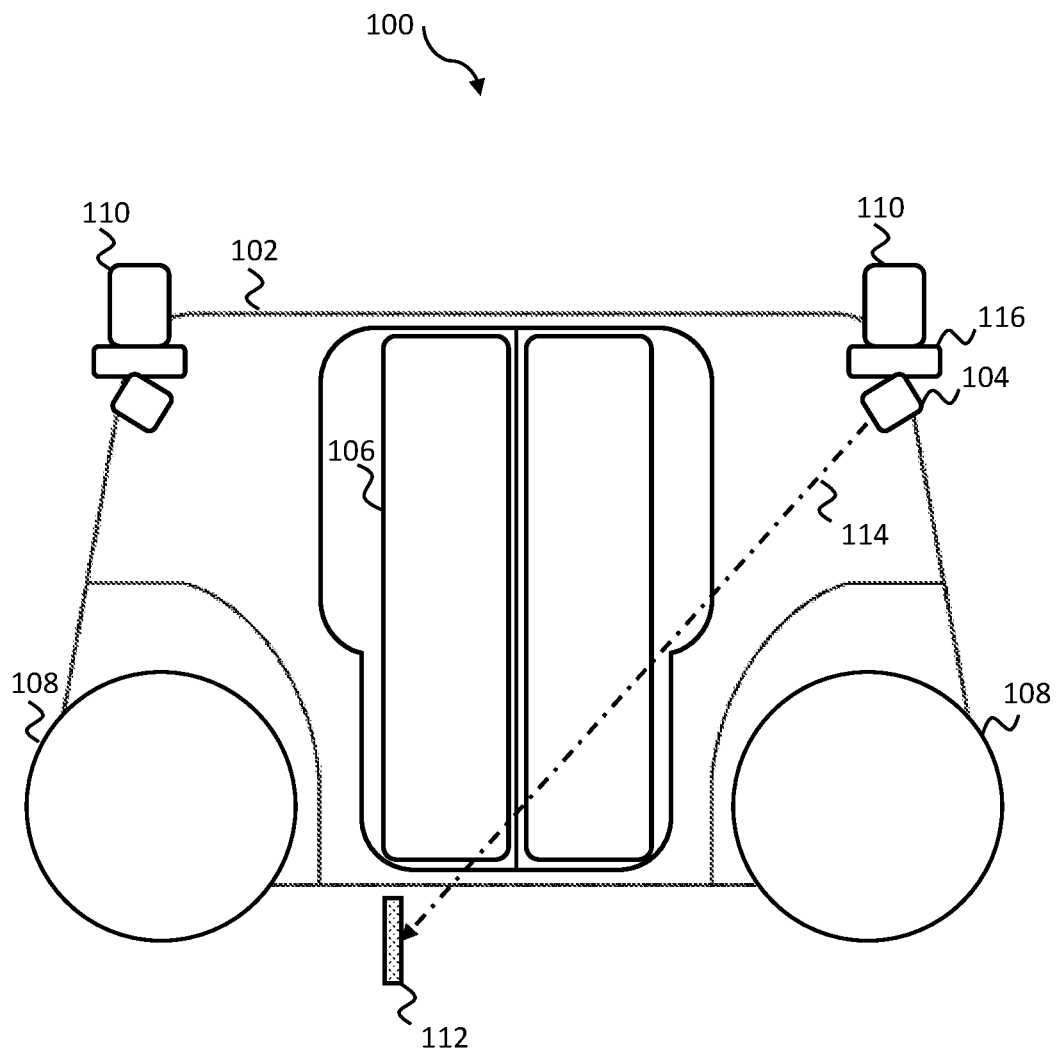

Finally, FIG. 2D depicts the vehicle 100 at a fourth, final time. Here, the projector 106 has again modified the light pattern 112 compared to the previous light pattern 112 depicted in FIG. 2C, where the light pattern 112 may be based on a final state of the door 106. In FIG. 2D, the light pattern 112 is a fourth light pattern 112 corresponding to a fourth footprint of the door 106 based on a fourth state of the door 106 (in this case, a state indicative of the door 106 being fully open, such as 90 degrees relative to the vehicle 100).

Together, FIGS. 2A, 2B, 2C and 2D convey the future motion of the door 106. As such, at a time after that depicted in FIG. 2D, the door 106 will begin to move in the manner indicated by the changing light pattern 112. The footprint of the door 106 will therefore sequentially correspond to the light patterns 112 in FIGS. 2A-2D.

Figure 3:
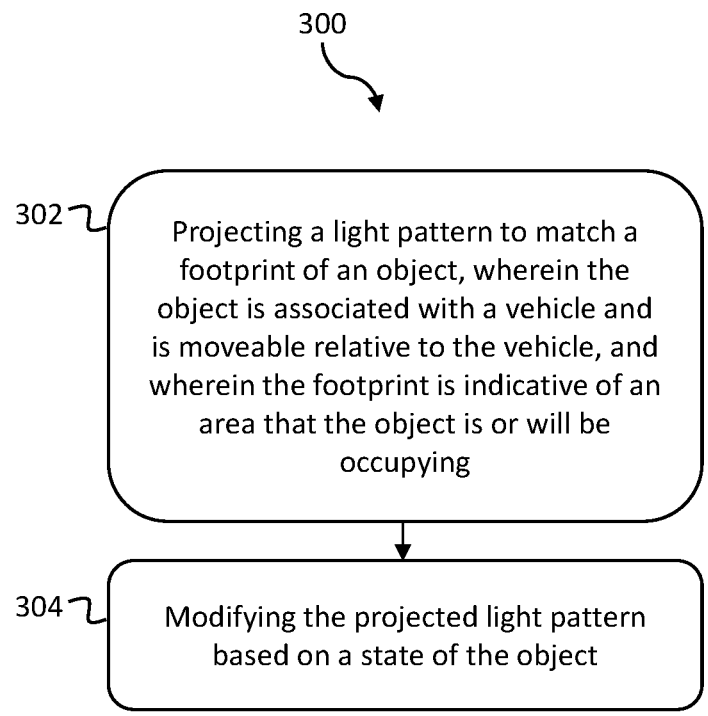
FIG. 3 depicts a flow chart of an example method of projecting and modifying a light pattern.

FIG. 3 illustrates a flow chart of an example method 300. The example method 300 may be implemented by one or more components of the vehicle 100. In one example, the method 300 may be encoded and stored as instructions on one or more non-transitory computer-readable media that, when executed by one or more processors of the vehicle 100, cause the vehicle 100 to implement the method 300.

As can be seen in FIG. 3, the method/process 300 comprises, at step 302, projecting a light pattern 112 to match a footprint of an object, wherein the object is associated with a vehicle 100 and is moveable relative to the vehicle 100, and wherein the footprint is indicative of an area that the object is or will be occupying.

At step 304, the method comprises modifying the projected light pattern 112 based on a state of the object.

In some examples, like those discussed in relation to FIGS. 2A-2D, the method 300 may comprise determining the state of the object. Step 304 may therefore comprise modifying the projected light pattern based on the determined state of the object as the object is moved relative to the vehicle 100.

Figure 4:
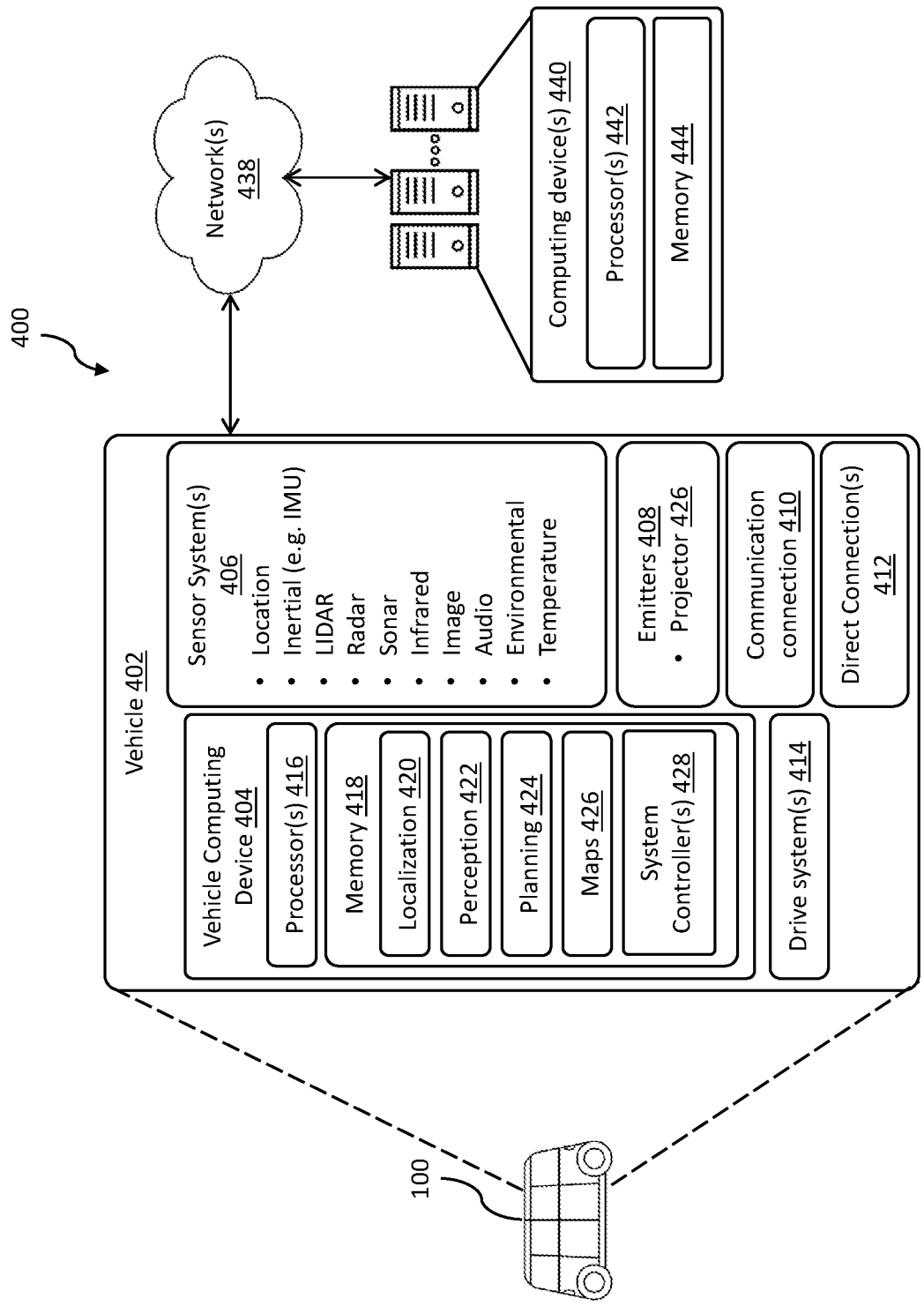
FIG. 4 is a block diagram of an example vehicle system.

FIG. 4 depicts a block diagram of an example system 400 for implementing the techniques described here. In some instances, the system 400 may include a vehicle 100, which may correspond to the vehicle 100 of FIGS. 1 and 2. In some instances, the vehicle 100 may be a self-driving or autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 100 may be a fully or partially autonomous vehicle having any other level or classification. Moreover, in some instances, the techniques described herein may be usable by non-autonomous vehicles as well.

The vehicle 100 can include vehicle computing device(s) 404, one or more sensor systems 406, one or more emitters 408, one or more communication connections 410, at least one direct connection 412 (e.g., for physically coupling the vehicle 100 to exchange data and/or to provide power), and one or more drive systems 414.

In some instances, the sensor(s) 406 may include light detection and ranging (LIDAR) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), drive system sensors for torque and/or velocity sensing etc. The sensor(s) 406 may include multiple instances of each of these or other types of sensors. For instance, the LIDAR sensors may include individual LIDAR sensors located at the corners, front, back, sides, and/or top of the vehicle 100. As another example, the cameras may include multiple cameras disposed at various locations about the exterior and/or interior of the vehicle 100. The sensor(s) 406 may provide input to the vehicle computing device(s) 404.

The vehicle 100 may also include the emitter(s) 408 for emitting light and/or sound. The emitter(s) 408 in this example may include interior audio and visual emitter(s) to communicate with passengers of the vehicle 100. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 408 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The one or more emitters(s) 408 may also include a projector 426. The projector 426 may correspond to the projector 104 of FIGS. 1 and 2, discussed above. The projector 426 may comprise an illumination source to emit the electromagnetic radiation. The projector 426 may also comprise one or more lenses to focus the electromagnetic radiation, and/or one or more color filters and/or light pattern filters.

The vehicle 100 may also include the communication connection(s) 410 that enable communication between the vehicle 100 and one or more other local or remote computing device(s). For instance, the communication connection(s) 410 may facilitate communication with other local computing device(s) on the vehicle 100 and/or the drive system(s) 414. Also, the communication connection(s) 410 may additionally or alternatively allow the vehicle 100 to communicate with other nearby computing device(s) (e.g., other nearby vehicles, traffic signals, etc.). The communication connection(s) 410 may additionally or alternatively enable the vehicle 100 to communicate with a computing device 440, which may be a remote computing device 440, such as a server.

The vehicle computing device(s) 404 can include one or more processors 416 and memory 418 communicatively coupled with the one or more processors 416. In the illustrated example, the memory 418 of the vehicle computing device(s) 404 stores a localization component 420 perception component 422, a planning component 424, one or more maps 426, and one or more system controllers 428. Though depicted in FIG. 4 as residing in memory 418 for illustrative purposes, it is contemplated that the localization component 420, the perception component 422, the planning component 424, the one or more maps 426, and the one or more system controllers 428 may additionally, or alternatively, be accessible to the vehicle 100 (e.g., stored remotely).

In some instances, the localization component 420 may be configured to receive data from the sensor system(s) 406 to determine a position and/or orientation of the vehicle 100 (e.g., one or more of an x-, y-, z-position, roll, pitch, or yaw). For example, the localization component 420 may include and/or request/receive a map 426 of an environment and may continuously determine a location and/or orientation of the autonomous vehicle within the map 426.

In some instances, the perception component 422 can include functionality to perform object detection, segmentation, and/or classification. In some examples, the perception component 422 can provide processed sensor data that indicates a presence of an entity that is proximate to the vehicle 100 and/or a classification of the entity as an entity type (e.g., car, pedestrian, cyclist, animal, building, tree, road surface, curb, sidewalk, unknown, etc.). In additional or alternative examples, the perception component 422 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In some instances, the planning component 424 may determine a location of a user based on image data of an environment received from the user using, for example, bags of binary words with image-based features, artificial neural network, and the like. Further, the planning component 424 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 100 may stop to pick up a passenger. In at least one example, the planning component 424 may determine a pickup location based at least in part on determining a user identity (e.g., determined via image recognition or received as an indication from a user device, as discussed herein).

In some instances, the one or more maps 426 may be used by the vehicle 100 to navigate within the environment. For the purpose of this discussion, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, multiple maps 426 may be stored based on, for example, a characteristic (e.g., type of entity, time of day, day of week, season of the year, etc.). Storing multiple maps 426 may have similar memory requirements, but increase the speed at which data in a map may be accessed.

In some instances, the vehicle computing device(s) 404 can perform the method 300 of FIG. 3, utilizing one or more components of the vehicle 400. For example, the processor(s) 416 may determine that an object is to move relative to the body when the sensor system 406 and localization component 420 or planning component 424 determines that the vehicle 100 has arrived at a particular location. The processor(s) 416 may determine a state of the object based on data received from the sensor system(s) 406.

In at least one example, the vehicle computing device(s) 404 can include one or more system controllers 428. The system controller 428 can be configured to control steering, propulsion, braking, safety, emitters, communication, and other systems of the vehicle 100. The system controller(s) 428 can communicate with and/or control corresponding systems of the drive system(s) 414 and/or other components of the vehicle 100. The system controller(s) 428 may be communicatively coupled to one or more sensors of the vehicle sensor system(s) 406. The system controller(s) 428 may be communicatively coupled to a drive system 414 that controls movement of an object, such as a door 106, ramp, steps, etc. of the vehicle 100. Data from the system controller(s) 428 may be used by the one or more processors 416 to determine a state of the object.

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive system controller which may receive and preprocess data from the sensor(s) and to control operation of the various vehicle systems. In some instances, the drive system controller may include one or more processors and memory communicatively coupled with the one or more processors. The memory may store one or more modules to perform various functionalities of the drive system(s) 414. Furthermore, the drive system(s) 414 may also include one or more communication connection(s) that enable communication by the respective drive system with one or more other local or remote computing device(s).

In some examples, the vehicle 100 can send operational data, including raw or processed sensor data from the sensor system(s) 406, to one or more computing device(s) 440 via the network(s) 438. The one or more computing device(s) 440 may comprise one or more processors 442 and memory 444. The one or more computing devices 440 may be remote from the vehicle.

In some instances, aspects of some or all of the components discussed herein may include any models, algorithms, and/or machine learning algorithms. For example, the component(s) in the memory 418, 444 may be implemented as a neural network. As can be understood in the context of this disclosure, a neural network can utilize machine learning, which can refer to a broad class of such algorithms in which an output is generated based on learned parameters.

FIG. 5 depicts a top-down view of the vehicle 100, to illustrate an exemplary two-dimensional footprint area (shown with shading) delimited by the light pattern 112. In this example, the object (i.e., the door 106), may move along a trajectory as it opens. The trajectory is illustrated by the arrow A. In some examples, the light pattern 112 may comprise an icon or other indicia indicative of a trajectory of the door 106. For example, the projector 104 may project an arrow onto the surface to better convey how the door 106 will move.

As mentioned, as the door 106 moves along the trajectory, the door 106 may sweep out/delimit an area on the surface. In some examples, the light pattern 112 may be projected within that area, so that the area is clearly signalled to a pedestrian. In a particular example, the projector 104 may be configured to project a light pattern 112 having a footprint area that substantially corresponds to the area. In some cases, light pattern 112 may have an outer envelope 118 (shown with dashed lines) that delimits a boundary of the area.

FIGS. 6A-6C illustrate how an example light pattern 112 may be modified based on a state of an object. This example light pattern 112 differs in appearance from that depicted in FIGS. 1A-2D. FIGS. 6A-6C show the light pattern 112 as viewed from above at different points in time, looking down onto the surface onto which the light pattern 112 is projected.

FIG. 6A illustrates the light pattern 112 at a first time. As mentioned, as the door 106 moves along the trajectory, the door 106 may sweep out/delimit an area on the surface. FIG. 6A depicts the light pattern 112 having a footprint area that substantially corresponds to the area delimited by the door at a first time. In some cases, the door 106 may have already begun to open. For example, the door 106 may have delimited an area less than or equal to the area shown in FIG. 6A. In other cases, the door 106 may have not yet opened.

FIGS. 6B and 6C show modified versions of the light pattern 112 to illustrate different states of the object. For example, FIG. 6B, illustrates the light pattern 112 at a second, later, time. Here, the state of door 106 is different to that shown in FIG. 6A, and the door 106 may be further along the trajectory than that shown in FIG. 6A. Accordingly, the area of the light pattern 112 is larger, to illustrate where the door has, or will be moving. Similarly, FIG. 6C, illustrates the light pattern 112 at a third, later, time. Again, the state of door 106 is different to that shown in FIG. 6B, and the trajectory is greater than that shown in FIG. 6B. Accordingly, the area of the light pattern 112 is larger, to illustrate where the door has, or will be moving. In this particular example, the light pattern 112 displayed in FIG. 6C corresponds to a final state of the door 106, illustrating where the door 106 will open to at its maximum point.

As mentioned, in certain examples, the projector 104 may project an object envelope to delimit a boundary of the area delimited by the object as it moves along a trajectory. FIGS. 7A-7C illustrate how another example light pattern 112 may be modified based on a state of an object. For example, FIG. 7A illustrates a light pattern 112 at a first time, where the light pattern 112 has a static component 702 and a moving component 704. The moving component 704 of this example is indicative of a particular state of the object, which in this case, is an initial state of the object. The moving component 704 is a component that is altered in appearance over time, as the light pattern 112 is modified, and may be based on different states of the object. The static component 702 of this example projects an envelope to illustrate the boundary of the area delimited by the object as it is moved.

FIG. 7B illustrates the light pattern 112 at a second time. Here, the static component 702 is unchanged from the light pattern 112 displayed at the earlier time shown in FIG. 7A, but the moving component 704 has been modified to illustrate a different state of the object. Similarly, FIG. 7C illustrates the light pattern 112 at a third time. Here, the static component 702 is unchanged from the light pattern 112 displayed at the earlier times shown in FIGS. 7A and 7B, but the moving component 704 has been modified further to illustrate a different state of the object.

As briefly mentioned above, in some examples, the projector 104 may be controlled based on one or more characteristics of the environment in which the vehicle 100 is located. The projector can therefore adapt to different environments, to better or more accurately display the light pattern 112. For example, one or more sensors 110 of the sensor system may detect/determine a characteristic of an environment in which the vehicle 100 is located, such as: (i) a distance between the projector 104 (and/or a sensor 110) and the surface 120 on which the light pattern 112 is projected, or (ii) the ambient light of the environment, or (iii) the type of surface 120 (such as the surface roughness, colour, or material), etc. After the characteristic has been determined, the projector 104 may be configured to project the light pattern 112 based on the detected characteristic. In some examples, the sensor system may be configured to detect the characteristic and generate environment data associated with the characteristic of the environment. The projector 104 may therefore be configured to project the light pattern 112 based on the environment data.

In an example, the detected characteristic may be a distance between the sensor 110 and a surface 120 on which the light pattern is projected, and the sensor system may be configured to determine, from this detected distance, a distance between the projector 104 and the surface 120 on which the light pattern is projected. Based on the distance between the projector 104 and the surface on which the light pattern is projected, the projector 104 may be configured to control a characteristic of the projection. For example, to ensure that the light pattern 112 matches a footprint of the object in a particular state, regardless of the distance, the projector 104 may control the beamwidth of the light pattern 104. In an example, the beamwidth may be widened when the distance is lower, and increased when the distance is greater. The distance between the projector 104 and the surface 120 may change because a suspension system of the vehicle 100 may raise or lower the vehicle 100 based on different requirements, or the vehicle 100 may be located in an area where there is a smaller or greater distance between the surface on which the light pattern 112 is projected (such as a sidewalk) and the surface on which the vehicle 100 is located (such as a road).

Figure 8A:
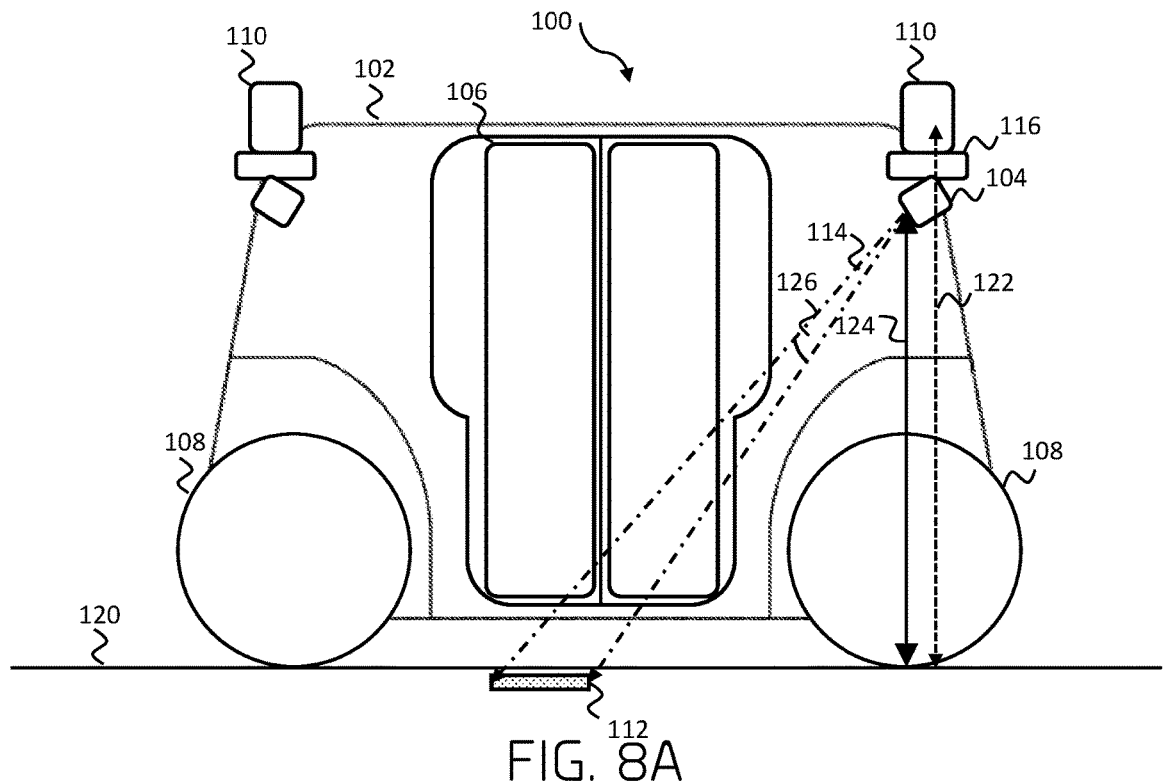
FIGS. 8A-8B are pictorial diagrams of another example vehicle with a projector that projects different light patterns based on characteristics of the environment.

As an example, FIG. 8A shows the vehicle 100 projecting a light pattern 112 onto a surface 120, such as a sidewalk. As mentioned, the vehicle may comprise one or more sensors 110 that form a sensor system. In the example of FIG. 8A, the sensor 110 may be a lidar sensor 110, which has a laser which emits light 122 towards the surface 120. Light 122 emitted by the lidar sensor 110 reflects from the surface 120, and is detected again by a detector associated with the lidar sensor. One or more processors of the vehicle 100 can determine, based on the time difference between emission and detection, the distance between the lidar sensor and the surface 120. In examples where there is a relatively large distance between the projector 104 and lidar sensor 110, this measured distance may be used to determine a distance 124 between the projector 104 and the surface 120. Characteristics of the projection/projector 104 may then be controlled based on the distance 124 between the projector 104 and the surface 120. For example, the beamwidth 126 and/or brightness of the emitted light may be increased or decreased based on the distance. In another example, a focus of the projector 104 may be controlled based on the distance 124. Adjusting the beamwidth of the projector 104 may comprise adjusting an aperture of the projector 104. In other examples, the sensor 110 may be an ultrasonic sensor to determine the distance. More generally, the sensor 110 may be a sensor configured to detect a distance.

In some examples, such as an example where the sensor 110 and the projector are substantially collocated, the distance 124 may be approximately equal to the distance between the sensor 110 and the surface 120, such that it is not necessary to separately calculate the distance 124.

Figure 8B:
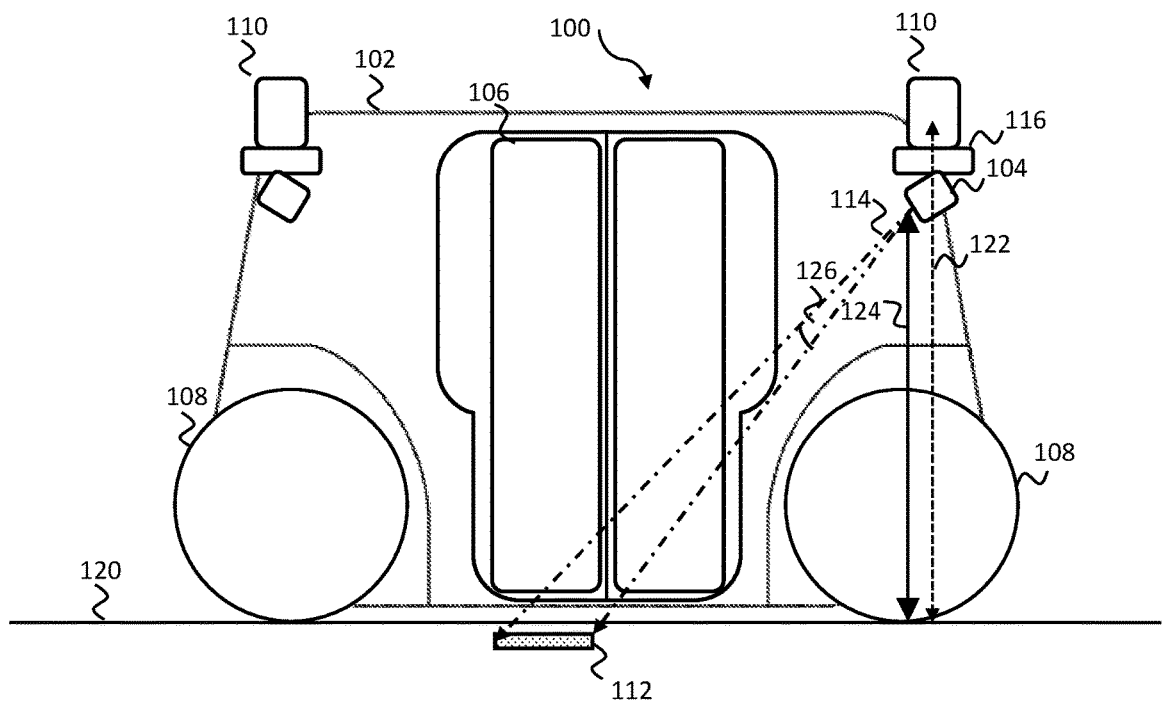

FIG. 8B shows the vehicle 100 at another time. In this example, a suspension system of the vehicle has been adjusted, such that the distance between the surface 120 and the underside of the vehicle is less than the example of FIG. 8A. Accordingly, the distance 124 between the projector 104 and the surface 120 is less than the example of FIG. 8B. Again, the sensor system may determine the distance 124, and can control characteristics of the projector 104. In this example, the beamwidth 126 is increased from that depicted in FIG. 8A because the distance 124 is smaller. This ensures that the footprint of the light pattern 112 accurately reflects the area that the object is or will be occupying, regardless of the distance 124.

In some examples, the vehicle may comprise a suspension system configured to raise and lower the vehicle 100 relative to the surface 120. In some cases, the projector 104 is controlled depending on an operating status of the suspension system, rather than requiring a sensor system to determine a characteristic of the environment. For example, the suspension system may generate suspension system data indicative of an operating status of the suspension system. The projection/projector 104 may be controlled based on the suspension system data. For example, the projector 104 may receive the suspension system data indicative of an operating status of the suspension system and project the light pattern 112 onto the surface 120 based on the suspension system data. As an example, the suspension system data may indicate that the suspension system has a particular operating status (such as "low profile"), indicating that the distance 124 is relatively small. The suspension system data may indicate that the suspension system has a different operating status (such as "high clearance"), indicating that the distance 124 is relatively large. In other examples, the operating status may be conveyed as a number, letter, or any other form of data.

Figure 9:
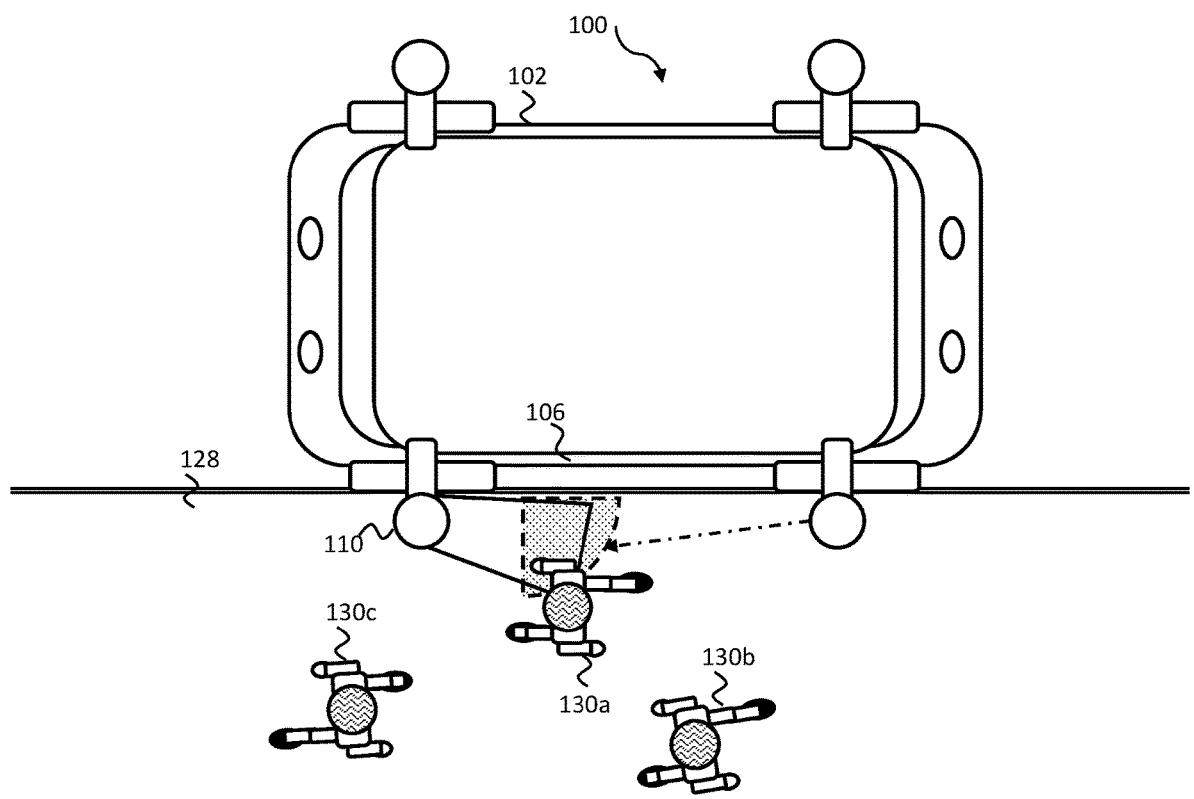
FIG. 9 is a pictorial diagram of another example vehicle as viewed from above and shows a pedestrian within an area occupied by the light pattern.

In some examples, the object, such as the door 106, may be moved only when it is determined that the area into which the object will move is clear, and free from obstruction. To illustrate this, FIG. 9 depicts a top-down view of the vehicle 100. The vehicle 100 has stopped at a particular location along a sidewalk 128, and a passenger (not shown) may be about to exit the vehicle 100. The vehicle 100 may therefore determine that an object, such as the door 106, is about to move. Before causing the door 106 to move, the sensor system may be configured to detect whether a second object, such as a pedestrian 130a-c or other object, is located within an area that the door 106 will soon occupy. This area (illustrated with shading in FIG. 9) may be the area on the surface 128 that the object delimits as it moves along a trajectory. In this particular example, a sensor 110 of the sensor system may detect the presence of a pedestrian 130a within the area. In certain examples, the vehicle 100 may cause the object/door 106 to move relative to the vehicle 100 when the sensor system detects that a pedestrian or other object is not located within the area. In this instance, the vehicle 100 may not move the object/door 106 because the sensor system detects that a pedestrian is located within the area. Movement of the door 106 may therefore be restricted. At a later point in time, the pedestrian 130a may move away from the area, and the door 106 may be safely opened. Such a system ensures the safety of pedestrians, as well as protecting the moveable object from damage.

The sensor 110 used to detect the presence of the second object, may be a lidar sensor, a video camera and/or a thermal sensor, in some examples.

In some examples, the vehicle 100 may comprise a notification system (which may include one or more emitters 408 depicted in FIG. 4) which may be configured to generate an audible or visual notification when the sensor system detects that a second object, such as a pedestrian 130a-c, is located within the area. This can alert the pedestrian 130a-c that they are obstructing the object. For example, a light emitter may flash a light to warn the pedestrian 130a, and/or an audio transducer may emit a siren or spoken message to warn the pedestrian 130a. In another example, a display (such as a screen) may display a visual notification, such as a message to alert the pedestrian that they are blocking the door 106.

In certain examples, the projector 104 may be configured to modify the light pattern 112 when the sensor system detects that a second object, such as a pedestrian 130a-c, is located within the area. For example, the shape, colour, position, area or other characteristic of the light pattern may be changed to alert the pedestrian that they are located within the area (and therefore blocking movement of the object/door 106). In one particular example, the light pattern is modified to change colour (such as to display a red light pattern) to indicate a potential hazard to the pedestrian). In one example, the light pattern is repeatedly turned on and off (i.e., in a flashing/blinking manner) to alert the pedestrian. In some examples, the area of the light pattern occupied by the second object (pedestrian) may be conveyed via the projector, so that the pedestrian knows they are partially occupying the total area indicated by the light pattern.

In certain examples, the vehicle 100 may be an autonomous vehicle, and may move/drive to a different location, away from the second object (such as the pedestrian 130a), when the sensor system detects that the pedestrian 130a is located within the area for a predetermined period of time. Accordingly, the sensor system may detect the presence of the pedestrian 130a and may wait a predetermined period of time before moving to a different location. For example, if the pedestrian 130a remains in the area for longer than 30 seconds, the vehicle 100 may drive to a different location, free from obstructions, so that the door 106 may be safely opened.

As mentioned above, the projector 104 may modify the light pattern 112 based on a state of the object. In some examples, this can be achieved by projecting a series of different light patterns 112 over time. In one example, this may involve use of a reflector that is positioned relative to the projector 104, such that light emitted by the projector 104 illuminates the reflector, and the reflector can be moved based on the configuration state of the object, such that the light pattern 112 projected by the projector 104 is modified as the reflector moves. In one example, the reflector may be coupled to the body 102 of the vehicle and its direction and/or orientation can be controlled by the one or more processors of the vehicle 100. For example, the reflector may be rotated by varying amounts to correspond to different states of the object. Light from the projector 104 may therefore be reflected by the reflector in different directions as the reflector is moved. This can therefore allow the light pattern to be modified based on the different states of the object. The use of a reflector provides a simple and efficient way of modifying a light pattern 112.

Figure 10A:
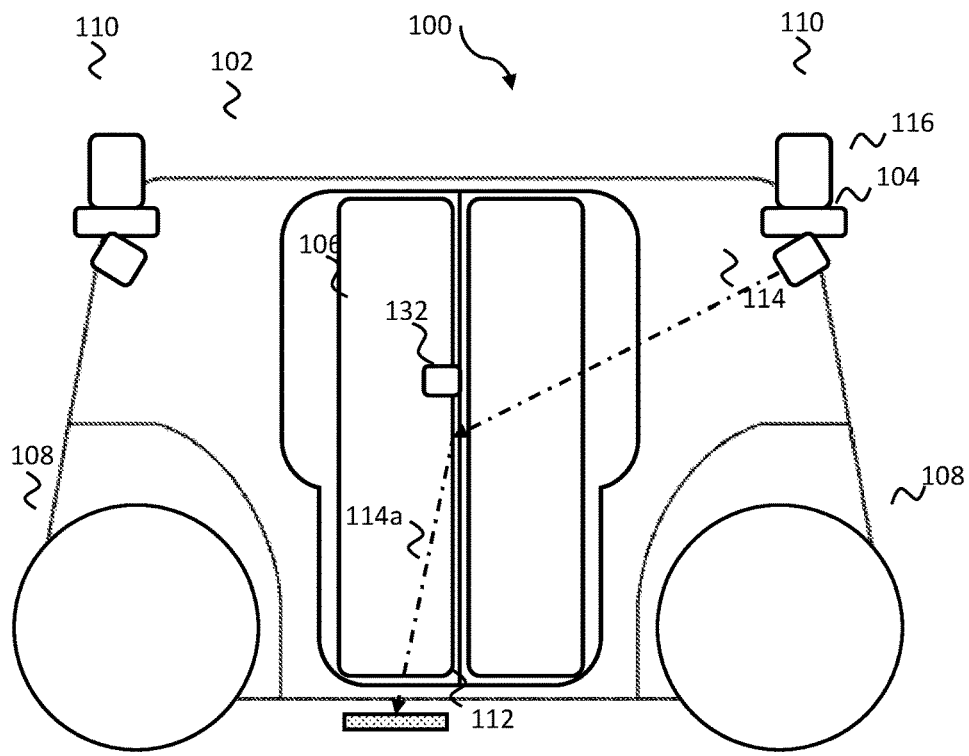
FIGS. 10A-10B are pictorial diagrams of another example vehicle with a projector that projects light towards a reflector mounted on a moveable object.
Figure 10B:
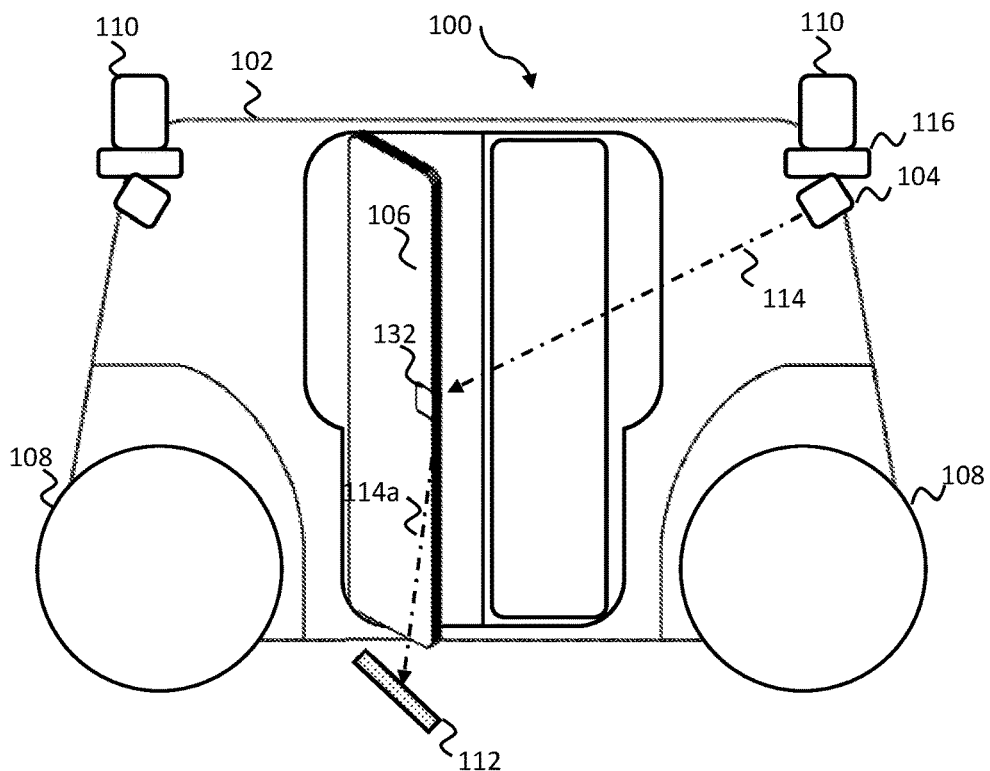

FIGS. 10A and 10B depict a particular example where the reflector 132 is mounted on the moveable object, in this case the door 106. The reflector 132 may be a reflective surface, such as a mirror, or a lens/prism etc.

FIG. 10A depicts the vehicle 100 at a first time. Here the object, such as the door 106, is in an initial state (for example, the door 106 may be closed) and the reflector 132 is shown affixed to the door 106. In some examples, the reflector 132 may comprise a plurality of reflector components that combine to provide the reflector 132. For example, different reflector components may be arranged on different surfaces of the door 106, and different reflector components may be illuminated by the projector 104 as the door 106 moves. As shown, the reflector 132 may be positioned relative to the projector 104 such that light 114 emitted by the projector 104 illuminates the reflector 132. FIG. 10A shows a reflected light beam 114a being reflected from the reflector 132 to form the light pattern 112 on a surface.

FIG. 10B depicts the vehicle 100 at a second, later time. Here, the door 106 has moved from the initial state depicted in FIG. 10A, and is now in a first state (i.e., open). Because the reflector is affixed to the door (which has moved), the reflector 132 has moved relative to the projector 104. The reflector 104 may therefore move as the object—in this case a door—moves. As a result of this movement, the reflected light beam 114a may reflect onto a different area on the surface, which is indicative of an area that the door 106 is or will be occupying at later time. The light pattern 112 has therefore been modified as the door 106 and reflector 132 moves. Affixing a reflector onto the moveable object can provide an efficient way to manipulate/control the light pattern as the object moves, without needing to actively control the projector 104. However, in some examples, the projector 104 may also be controlled based on the state of the object.

Figure 11:
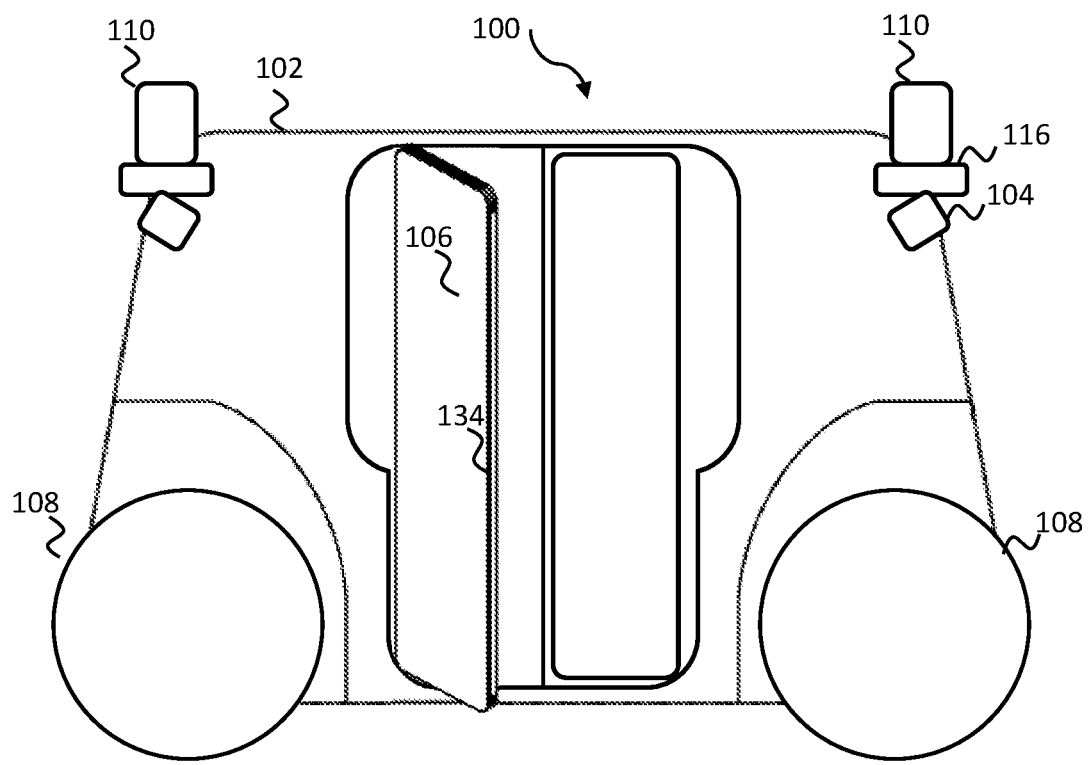
FIG. 11 is a pictorial diagram of another example vehicle having an additional illumination source mounted on a moveable object.
Figure 12:
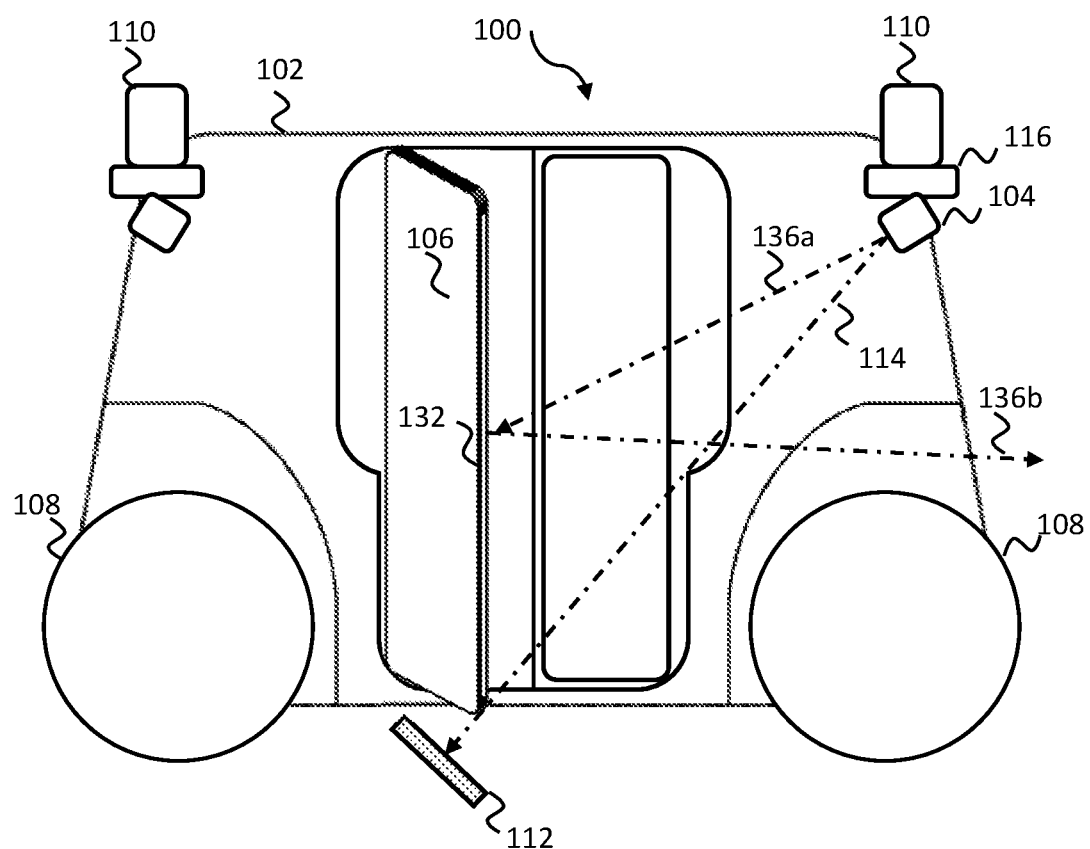
FIG. 12 is pictorial diagram of another example vehicle with a projector that projects light towards a reflector mounted on a moveable object.

In some examples, to increase the visibility of the moving object, and therefore improve safety, the vehicle may have an illumination source mounted on the object. FIG. 11 depicts an illumination source 134 in the form of a lighting strip 134 that may be located along an outwardly facing edge of the door 106. In other examples, one or more other illumination sources may be mounted on one or more other surfaces of the object. Light emitted by the illumination source 134 may be visible by a pedestrian in addition to, or instead of the light pattern 112 projected by the projector 104. In some examples, the illumination source 134 may be configured to emit light when it is determined that the object is to move relative to the body 102 of the vehicle. In some examples, the illumination source 134 may be configured to emit light when the object is moved. In another example, in addition or instead of the illumination source 134, a reflector 132 may be mounted on the moveable object and be positioned/arranged so that it reflects light towards a pedestrian, rather than onto the surface (as in FIGS. 10A and 10B). FIG. 12 depicts such a reflector 132 located along an outwardly facing edge of the door 106. In other examples, the reflector 132 may be mounted on different surfaces of the object. In some examples, there may be other reflectors mounted on one or more other surfaces of the object. Light reflected by the reflector 132 may therefore be visible by a pedestrian in addition to the light pattern 112 projected by the projector 104. FIG. 12 therefore depicts a light beam 114 being emitted by the projector 104 to form the light pattern 112, and a separate light beam 136a being emitted towards the reflector 132, and a reflected light beam 136b being emitted towards a pedestrian (not shown). The light beam 136a emitted towards the reflector may be of a different wavelength compared to the light beam 114 forming the light pattern 112. Accordingly, the vehicle may control an illumination source of the projector (where the illumination source is configured to emit light towards the reflector) and as the reflector moves, light is reflected as the reflector moves.

In another example, rather than reflecting light from the projector 104, a different illumination source may illuminate the reflector 132.

In the above examples, the door 106 is illustrated as opening in an arc, pivoting around an axis of rotation. In other examples however, the door 106 may open differently. For example, the door may initially move outwards, in a direction perpendicular to the direction of travel of the vehicle, before moving/sliding in a direction parallel to the direction of travel.

In the above examples, only one door 106 is illustrated as moving relative to the vehicle. In other examples however, there may be two or more objects (such as two or more doors) opening. In a specific example, two doors 106 open at the same time. In some examples, the light pattern projected by the projector 104 is indicative of motion of both doors. Put another way, the projector 104 may project two light patterns, a first light pattern corresponding to a footprint of one door, and a second light pattern corresponding to a footprint of a second door. Both light patterns may be projected at substantially the same time. In another example, two or more projectors are used to project the two or more light patterns. For example, a first projector may project a first light pattern corresponding to a footprint of one door, and a second projector may project a second light pattern corresponding to a footprint of a second door.

Example Clauses

1. A vehicle, comprising: a body; a projector; a sensor system configured to determine a state of an object, the object being associated with the vehicle; one or more processors coupled to the projector and the sensor system; and one or more non-transitory computer readable media storing instructions executable by the one or more processors, wherein the instructions, when executed by the one or more processors, cause the vehicle to perform operations comprising: determining that the object is to move relative to the body; projecting, by the projector, a light pattern based on the determination that the object is to move; and modifying, based on the state of the object determined by the sensor system, the light pattern projected by the projector to match a footprint of the object as the object moves, wherein the footprint is indicative of an area that the object is or will be occupying.

2. The vehicle of clause 1, wherein the object is one of: a vehicle door; a ramp; and a set of steps.

3. The vehicle of clause 1 or 2, wherein modifying, based on a state of the object, the light pattern projected by the projector comprises: projecting a first light pattern corresponding to a first footprint of the object based on a first state of the object, wherein the first footprint is indicative of an area that the object is or will be occupying at a first time; and projecting a second light pattern corresponding to a second footprint of the object based on a second state of the object, wherein the second footprint is indicative of an area that the object is or will be occupying at a second time; wherein at least one of: the first footprint is orientated differently to the second footprint relative to the vehicle; and the first footprint has a different sized area to the second footprint.

4. The vehicle of any of clauses 1 to 3, wherein the sensor system is further configured to determine a distance between the projector and a surface on which the light pattern is projected, wherein the instructions, when executed by the one or more processors, cause the vehicle to perform operations comprising: controlling a characteristic of the projection based on the distance.

5. The vehicle of any of clauses 1 to 4, wherein the projector is configured to emit light, and the vehicle further comprises: a reflector, mounted on the object and positioned relative to the projector, wherein light emitted by the projector illuminates the reflector as the object moves; wherein as the object moves, the state of the object changes, and the light pattern projected by the projector is modified as the object moves.

6. The vehicle of any of clauses 1 to 5, wherein movement of the object along a trajectory delimits an area on a surface on which the light pattern is projected, and the vehicle further comprises: a sensor system configured to: detect whether a second object is located within the area; and wherein the instructions, when executed by the one or more processors, cause the vehicle to perform operations comprising at least one of: causing the object to move relative to the vehicle when the sensor system detects that a second object is not located within the area; and restricting movement of the object when the sensor system detects that a second object is located within the area.

7. A method, comprising: projecting a light pattern to match a footprint of an object, wherein the object is associated with a vehicle and is moveable relative to the vehicle, and wherein the footprint is indicative of an area that the object is or will be occupying; and modifying the projected light pattern based on a state of the object.

8. The method of clause 7, further comprising: determining the state of the object; and modifying the projected light pattern based on the determined state of the object as the object is moved relative to the vehicle.

9. The method of clause 7 or 8, wherein modifying the light pattern based on a state of the object, comprises: projecting a first light pattern corresponding to a first footprint of the object based on a first state of the object, wherein the first footprint is indicative of an area that the object is or will be occupying at a first time; and projecting a second light pattern corresponding to a second footprint of the object based on a second state of the object, wherein the second footprint is indicative of an area that the object is or will be occupying at a second time; wherein at least one of: the first footprint is orientated differently to the second footprint relative to the vehicle; and the first footprint has a different sized area to the second footprint.

10. The method of any of clauses 7 to 9, wherein the object is to move relative to the vehicle along a trajectory, and wherein movement of the object along the trajectory delimits an area, and the light pattern is projected within the area.

11. The method of any of clauses 7 to 10, further comprising: determining a characteristic of an environment in which the vehicle is located; and projecting the light pattern based on the determined characteristic.

12. The method of clause 11, wherein the characteristic of the environment is a distance between a projector of the vehicle and a surface on which the light pattern is projected by the projector, and the method comprises: controlling a characteristic of the projection based on the distance.

13. The method of any of clauses 7 to 12, further comprising: determining an operating state of a suspension system of the vehicle, the suspension system being configured to raise and lower the vehicle; and projecting the light pattern based on the operating state of the suspension system.

14. The method of any of clauses 7 to 13, further comprising: controlling an illumination source of the projector, the illumination source being configured to emit light towards a reflector; wherein as the reflector moves, the projected light pattern is modified as the reflector moves.

15. The method of clause 14, wherein the reflector is mounted on the object, and movement of the object causes the reflector to move relative to the projector, wherein as the object moves, the state of the object changes, and the projected light pattern is modified as the object moves.

16. The method of any of clauses 7 to 15, wherein movement of the object along a trajectory delimits an area, and the method further comprises: determining whether a second object is located within the area; and one of: causing the object to move relative to the vehicle when a second object is not located within the area; and restricting movement of the object when a second object is located within the area.

17. The method of any of clauses 7 to 16, wherein movement of the object along a trajectory delimits an area, the method further comprising: determining that a second object is located within the area; and responsively, generating an audible or visual notification.

18. The method of any of clauses 7 to 17, wherein movement of the object along a trajectory delimits an area, and wherein the vehicle is an autonomous driving vehicle, the method further comprising: determining that a second object is located within the area for a predetermined period of time; and responsively, moving the vehicle to a different location, away from the second object.

19. The method of any of clauses 7 to 18, wherein movement of the object along a trajectory delimits an area, the method further comprising: determining that a second object is located within the area; and modifying the light pattern based on the determination that the second object is located in the area.

20. One or more non-transitory computer-readable media storing instructions that, when executed by one or more processors of a vehicle, cause the vehicle to perform operations comprising: causing a projector of the vehicle to project a light pattern to match a footprint of an object, wherein the object is associated with the vehicle and is moveable relative to the vehicle, and wherein the footprint is indicative of an area that the object is or will be occupying; and causing the projector to modify the projected light pattern based on a state of the object.

21. The method of any of clauses 7 to 19, further comprising: emitting light from an illumination source mounted on the moveable object.

22. A vehicle, comprising: a body; a projector; one or more processors coupled to the projector; and one or more non-transitory computer readable media storing instructions executable by the one or more processors, wherein the instructions, when executed by the one or more processors, cause the vehicle to perform operations, comprising: determining that an object associated with the vehicle is to move relative to the body; projecting, by the projector, a light pattern based on the determination that the object is to move; and modifying, based on a state of the object, the light pattern projected by the projector to match a footprint of the object, wherein the footprint is indicative of an area that the object is or will be occupying.

23. A vehicle, comprising: a projector; one or more processors coupled to the projector; and one or more non-transitory computer readable media storing instructions executable by the one or more processors, wherein the instructions, when executed by the one or more processors, cause the vehicle to perform operations comprising: projecting, by the projector, a light pattern to match a footprint of an object, wherein the object is associated with the vehicle and is moveable relative to the vehicle, and wherein the footprint is indicative of an area that the object is or will be occupying; and modifying the projected light pattern based on a state of the object. In some examples, the vehicle comprises a body.

24. The vehicle of clause 22 or 23, further comprising: a sensor system configured to determine the state of the object; and wherein the instructions, when executed by the one or more processors, cause the vehicle to perform operations comprising: modifying the light pattern projected by the projector as the object is moved relative to the body, based on the state determined by the sensor system.

25. The vehicle of any of clauses 22 to 24, wherein modifying, based on a state of the object, the light pattern projected by the projector comprises: projecting a first light pattern corresponding to a first footprint of the object based on a first state of the object, wherein the first footprint is indicative of an area that the object is or will be occupying at a first time; and projecting a second light pattern corresponding to a second footprint of the object based on a second state of the object, wherein the second footprint is indicative of an area that the object is or will be occupying at a second time; wherein at least one of: the first footprint is orientated differently to the second footprint relative to the vehicle; and the first footprint has a different sized area to the second footprint.

26. The vehicle of any of clauses 22 to 25, wherein the object is to move relative to the vehicle along a trajectory, and wherein movement of the object along the trajectory delimits an area, and the projector is configured to project the light pattern within the area.

27. The vehicle of clause 26, wherein the projector is configured to project an object envelope to delimit a boundary of the area.

28. The vehicle of clause 7, comprising: a sensor system configured to: detect a characteristic of an environment in which the vehicle is located; and generate environment data associated with the characteristic of the environment; and the projector is configured to project the light pattern based on the environment data.

29. The vehicle of clause 28, wherein the characteristic of the environment is a distance between the sensor and a surface on which the light pattern is projected, and the projector is configured to control a characteristic of the projection based on the distance.

30. The vehicle of any of clauses 22 to 29, further comprising a suspension system configured to raise and lower the vehicle relative to the surface; and the projector is configured to: receive suspension system data indicative of an operating status of the suspension system; and project the light pattern onto the surface based on the suspension system data.

31. The vehicle of any of clauses 22 to 30, wherein the projector is configured to emit light, and the vehicle further comprises: a reflector positioned relative to the projector such that light emitted by the projector illuminates the reflector; wherein the instructions, when executed by the one or more processors, cause the vehicle to perform operations comprising: causing the reflector to move based on the state of the object, such that the light pattern projected by the projector is modified as the reflector moves.

32. The vehicle of clause 31, wherein the reflector is mounted on the object, and movement of the object causes the reflector to move relative to the projector; wherein the instructions, when executed by the one or more processors, cause the vehicle to perform operations comprising: causing the object to move, thereby causing the state of the object to change, such that the light pattern projected by the projector is modified as the object moves.

33. The vehicle of any of clauses 22 to 32, wherein movement of the object along a trajectory delimits an area, and the vehicle further comprises: a sensor system configured to: detect whether a second object is located within the area; and wherein the instructions, when executed by the one or more processors, cause the vehicle to perform operations comprising at least one of: causing the object to move relative to the vehicle when the sensor system detects that a second object is not located within the area; and restricting movement of the object when the sensor system detects that a second object is located within the area.

34. The vehicle of any of clauses 22 to 33, wherein movement of the object along a trajectory delimits an area, and the vehicle further comprises: a sensor system configured to: detect whether a second object is located within the area; and a notification system, configured to: generate an audible or visual notification when the sensor system detects that a second object is located within the area.

35. The vehicle of any of clauses 22 to 34, wherein movement of the object along a trajectory delimits an area, and wherein the vehicle is an autonomous driving vehicle, and the vehicle further comprises: a sensor system configured to: detect whether a second object is located within the area; and wherein the instructions, when executed by the one or more processors, cause the vehicle to perform operations comprising: causing the vehicle to drive to a different location, away from the second object, when the sensor system detects that a second object is located within the area for a predetermined period of time.

36. The vehicle of any of clauses 22 to 35, further comprising: an illumination source mounted on the moveable object, and configured to emit light.

37. A vehicle, comprising: a body; a projector; one or more processors coupled to the projector; and one or more non-transitory computer readable media storing instructions executable by the one or more processors, wherein the instructions, when executed by the one or more processors, cause the vehicle to perform operations comprising: determining that an object associated with the vehicle is to move relative to the body; and projecting, by the projector, a light pattern based on the determination that the object is to move, the light pattern indicative of a position of the object, after being moved, relative to the vehicle.

While the example clauses described above are described with respect to one particular implementation, it should be understood that, in the context of this document, the content of the example clauses can also be implemented via a method, device, system, computer-readable medium, and/or another implementation. Additionally, any of example clauses 1-37 may be implemented alone or in combination with any other one or more of the example clauses.

What is claimed is:

1. A vehicle, comprising:
a body;
a projector;
one or more processors coupled to the projector; and
one or more processors coupled to the projector and the sensor system; and
one or more non-transitory computer readable media storing instructions executable by the one or more processors, wherein the instructions, when executed by the one or more processors, cause the vehicle to perform operations comprising:
determining that an object is to move relative to the body;
projecting, by the projector, a light pattern based on the determination that the object is to move; and
controlling an illumination source of the projector, the illumination source being configured to emit light towards a reflector, wherein the projected light pattern is modified as the reflector moves, the projected light pattern modified based on a state of the object.

2. The vehicle of claim 1, wherein the object is one of:
a vehicle door;
a ramp; and
a set of steps.

3. The vehicle of claim 1, comprising:
projecting a first light pattern corresponding to a first footprint of the object based on a first state of the object, wherein the first footprint is indicative of an area that the object is or will be occupying at a first time; and
projecting a second light pattern corresponding to a second footprint of the object based on a second state of the object, wherein the second footprint is indicative of an area that the object is or will be occupying at a second time;
wherein at least one of:
the first footprint is orientated differently to the second footprint relative to the vehicle; and
the first footprint has a different sized area to the second footprint.

4. The vehicle of claim 1, the vehicle comprising a first sensor system configured to determine a distance between the projector and a surface on which the light pattern is projected, wherein the instructions, when executed by the one or more processors, cause the vehicle to perform operations comprising:
controlling a characteristic of the projection based on the distance.

5. The vehicle of claim 1, wherein the reflector is mounted on the object and positioned relative to the projector, wherein light emitted by the projector illuminates the reflector as the object moves;
wherein as the object moves, the state of the object changes, and the light pattern projected by the projector is modified as the object moves.

6. The vehicle of claim 1, wherein movement of the object along a trajectory delimits an area on a surface on which the light pattern is projected, and the vehicle further comprises:
a second sensor system configured to:
detect whether a second object is located within the area; and wherein the instructions, when executed by the one or more processors, cause the vehicle to perform operations comprising at least one of:
causing the object to move relative to the vehicle when the second sensor system detects that a second object is not located within the area; and
restricting movement of the object when the second sensor system detects that a second object is located within the area.

7. A method, comprising:
projecting, by a projector, a light pattern to match a footprint of an object, wherein the object is associated with a vehicle and is moveable relative to the vehicle, and wherein the footprint is indicative of an area that the object is or will be occupying; and
controlling an illumination source of the projector, the illumination source being configured to emit light towards a reflector, wherein the projected light pattern is modified as the reflector moves, the projected light pattern modified based on a state of the object.

8. The method of claim 7, further comprising:
determining the state of the object; and
modifying the projected light pattern based on the determined state of the object as the object is moved relative to the vehicle.

9. The method of claim 7, comprising:
projecting a first light pattern corresponding to a first footprint of the object based on a first state of the object, wherein the first footprint is indicative of an area that the object is or will be occupying at a first time; and
projecting a second light pattern corresponding to a second footprint of the object based on a second state of the object, wherein the second footprint is indicative of an area that the object is or will be occupying at a second time;
wherein at least one of:
the first footprint is orientated differently to the second footprint relative to the vehicle; and
the first footprint has a different sized area to the second footprint.

10. The method of claim 7, wherein the object is to move relative to the vehicle along a trajectory, and wherein movement of the object along the trajectory delimits an area, and the light pattern is projected within the area.

11. The method of claim 7, further comprising:
determining a characteristic of an environment in which the vehicle is located; and
projecting the light pattern based on the determined characteristic.

12. The method of claim 11, wherein the characteristic of the environment is a distance between a projector of the vehicle and a surface on which the light pattern is projected by the projector, and the method comprises:
controlling a characteristic of the projection based on the distance.

13. The method of claim 7, further comprising:
determining an operating state of a suspension system of the vehicle, the suspension system being configured to raise and lower the vehicle; and
projecting the light pattern based on the operating state of the suspension system.

14. The method of claim 7, wherein the reflector is mounted on the object, and movement of the object causes the reflector to move relative to the projector, wherein as the object moves, the state of the object changes, and the projected light pattern is modified as the object moves.

15. The method of claim 7, wherein movement of the object along a trajectory delimits an area, and the method further comprises:
determining whether a second object is located within the area; and
one of:
causing the object to move relative to the vehicle when a second object is not located within the area; and
restricting movement of the object when a second object is located within the area.

16. The method of claim 7, wherein movement of the object along a trajectory delimits an area, the method further comprising:
determining that a second object is located within the area; and
responsively, generating an audible or visual notification.

17. The method of claim 7, wherein movement of the object along a trajectory delimits an area, and wherein the vehicle is an autonomous driving vehicle, the method further comprising:
determining that a second object is located within the area for a predetermined period of time; and
responsively, moving the vehicle to a different location, away from the second object.

18. The method of claim 7, wherein movement of the object along a trajectory delimits an area, the method further comprising:
determining that a second object is located within the area; and
modifying the light pattern based on the determination that the second object is located in the area.

19. One or more non-transitory computer-readable media storing instructions that, when executed by one or more processors of a vehicle, cause the vehicle to perform operations comprising:
causing a projector of the vehicle to project a light pattern to match a footprint of an object, wherein the object is associated with the vehicle and is moveable relative to the vehicle, and wherein the footprint is indicative of an area that the object is or will be occupying; and
controlling an illumination source of the projector, the illumination source being configured to emit light towards a reflector, wherein the projected light pattern is modified as the reflector moves, the projected light pattern modified based on a state of the object.

* * * * *